(12) United States Patent
Ohsawa et al.

(10) Patent No.: US 9,310,894 B2
(45) Date of Patent: Apr. 12, 2016

(54) PROCESSING OPERATION SIGNALS FROM A POINTING DEVICE AND/OR AN INPUT DEVICE

(75) Inventors: Kazuyoshi Ohsawa, Kyoto (JP); Takafumi Masaoka, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 1450 days.

(21) Appl. No.: 13/033,996

(22) Filed: Feb. 24, 2011

(65) Prior Publication Data

US 2012/0133582 A1 May 31, 2012

(30) Foreign Application Priority Data

Nov. 26, 2010 (JP) .................................. 2010-263809

(51) Int. Cl.
*G06F 3/033* (2013.01)
*G06F 3/03* (2006.01)

(52) U.S. Cl.
CPC ............ *G06F 3/0325* (2013.01); *G06F 3/0308* (2013.01)

(58) Field of Classification Search
None
See application file for complete search history.

(56) References Cited

U.S. PATENT DOCUMENTS

| | | | | |
|---|---|---|---|---|
| 5,917,472 A * | 6/1999 | Perala | ............................ | 345/157 |
| 2002/0149563 A1 * | 10/2002 | Swofford | ................ | G06F 3/038 |
| | | | | 345/161 |
| 2004/0250278 A1 * | 12/2004 | Imai | ...................... | G06F 3/0481 |
| | | | | 725/40 |
| 2007/0265088 A1 | 11/2007 | Nakada et al. | | |
| 2009/0121894 A1 * | 5/2009 | Wilson et al. | ............ | 340/825.52 |
| 2009/0241038 A1 * | 9/2009 | Izuno et al. | .................... | 715/757 |
| 2009/0295721 A1 * | 12/2009 | Yamamoto et al. | ........... | 345/158 |
| 2009/0298590 A1 * | 12/2009 | Marks | ..................... | A63F 13/02 |
| | | | | 463/37 |
| 2010/0097309 A1 | 4/2010 | Nishida et al. | | |
| 2010/0105480 A1 * | 4/2010 | Mikhailov et al. | .............. | 463/38 |
| 2010/0201808 A1 * | 8/2010 | Hsu | .............................. | 348/135 |
| 2011/0310008 A1 * | 12/2011 | Chuang et al. | ................ | 345/157 |

FOREIGN PATENT DOCUMENTS

| | | |
|---|---|---|
| JP | 06-208435 | 7/1994 |
| JP | 2007-301038 | 11/2007 |
| JP | 2010-097429 | 4/2010 |

\* cited by examiner

*Primary Examiner* — Ilana Spar
*Assistant Examiner* — Kirk Hermann
(74) *Attorney, Agent, or Firm* — Nixon & Vanderhye PC

(57) ABSTRACT

A position indicated on a predetermined plane is calculated based on a first operation signal output from a pointing device, and it is determined whether or not the indicated position has moved from out of a predetermined area on the plane into the predetermined area. When a result of the determination is positive in a state where a second operation signal is used for information processing, operation signals used for the information processing are switched from the second operation signal to the first operation signal.

18 Claims, 16 Drawing Sheets

F I G. 1 5
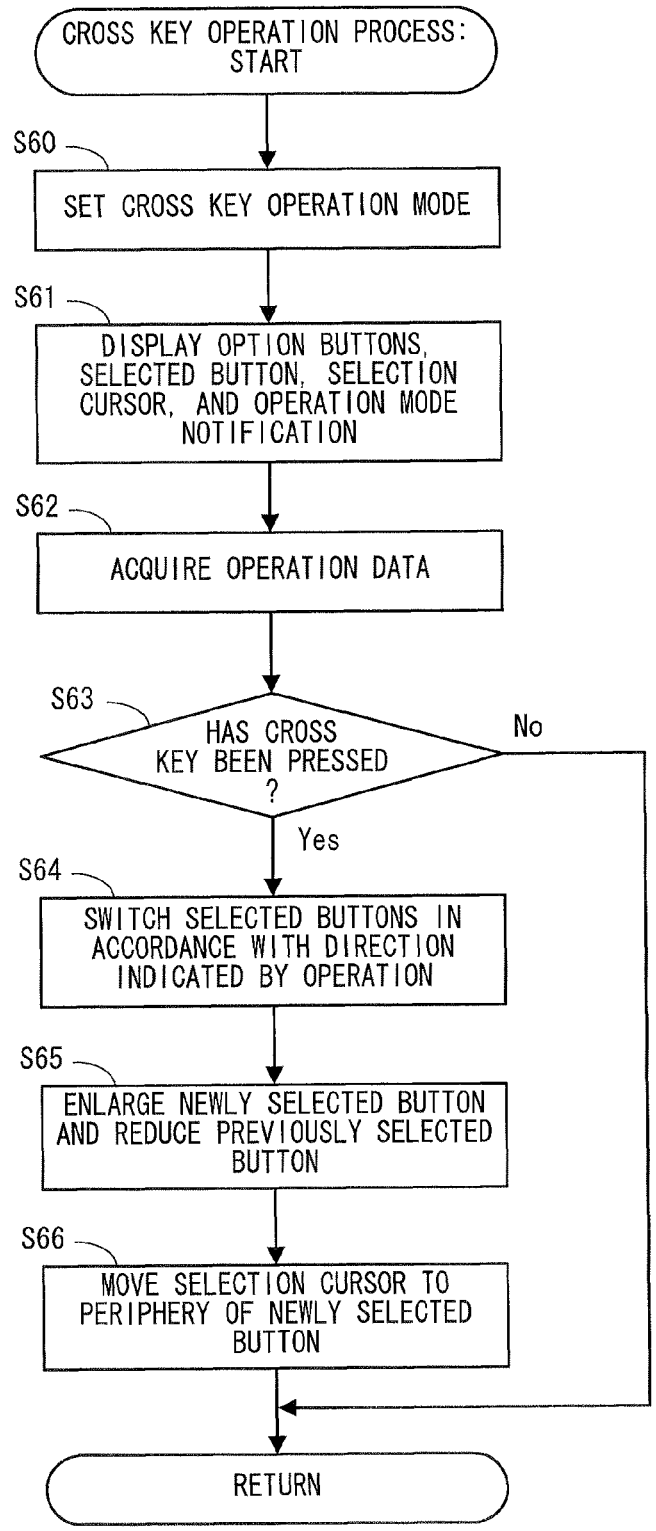

PROCESSING OPERATION SIGNALS FROM A POINTING DEVICE AND/OR AN INPUT DEVICE

CROSS REFERENCE TO RELATED APPLICATION

The disclosure of Japanese Patent Application No. 2010-263809, filed on Nov. 26, 2010, is incorporated herein by reference.

BACKGROUND OF THE INVENTION

1. Field of the Invention

The present invention relates to a storage medium having stored thereon an information processing program, an information processing apparatus, an information processing system, and an information processing method, and in particular relates to a storage medium having stored thereon an information processing program that performs predetermined information processing by performing input operations using, for example, a pointing device and input means different from the pointing device, and also relates to an information processing apparatus, an information processing system, and an information processing method.

2. Description of the Background Art

Conventionally, as disclosed in, for example, Japanese Laid-Open Patent Publication No. 06-208435 (hereinafter referred to as "Patent Literature 1"), a device is known that performs predetermined information processing using one of a plurality of input devices. Patent Literature 1 discloses a coordinate-input-device-switching device that selects either one of a plurality of pieces of coordinate information obtained by performing input operations using a plurality of input devices, and outputs the selected piece of coordinate information as coordinate information for performing information processing. For example, the switching device disclosed in Patent Literature 1 acquires both coordinate information obtained by performing an input operation using a mouse and coordinate information obtained by performing an input operation using a tablet. When the input operation using either the mouse or the tablet has continued for a predetermined time or longer, the coordinate information obtained by performing the input operation that has continued for the predetermined time or longer is selected and output.

When, however, one of the input operations of the mouse and the tablet is switched to the other, the switching device disclosed in Patent Literature 1 switches the input operations after having allowed the other input operation to continue for the predetermined time. This makes it impossible to switch the input operations at a time intended by a user.

SUMMARY OF THE INVENTION

Therefore, it is an object of the present invention to provide a storage medium having stored thereon an information processing program capable of, when input operations are performed using a plurality of types of input means, switching the input operations in accordance with a user's intention, and to also provide an information processing apparatus, an information processing system, and an information processing method.

To achieve the above object, the present invention may employ the following configurations.

An example of the configuration of a computer-readable storage medium having stored thereon an information processing program according to the present invention is executed by a computer of an information processing apparatus that can use operation signals output respectively from a pointing device and an input device different from the pointing device and performs predetermined information processing in accordance with the operation signals. The information processing program causes the computer to function as first operation signal acquisition means, second operation signal acquisition means, indicated position calculation means, indicated position determination means, switching means, processing means, and display control means. The first operation signal acquisition means acquires a first operation signal output from the pointing device. The second operation signal acquisition means acquires a second operation signal output from the input device. The indicated position calculation means, based on the first operation signal, calculates a position indicated on a predetermined plane. The indicated position determination means determines whether or not the indicated position has moved from out of a predetermined area on the plane into the predetermined area. The switching means switches the operation signals used for the information processing from the second operation signal to the first operation signal, when a result of the determination of the indicated position determination means is positive in a state where the second operation signal is used for the information processing. The processing means performs the information processing based on the indicated position, when the switching means has switched the operation signals used for the information processing from the second operation signal to the first operation signal.

Based on the above, when the predetermined information processing is performed in accordance with an operation using the pointing device or with an operation using the different input device, it is possible to switch the operation methods in accordance with a user's intention.

In addition, the information processing program may further cause the computer to function as input determination means. The input determination means determines, based on the second operation signal, whether or not an input operation has been performed on the input device. In this case, the switching means may switch the operation signals used for the information processing from the second operation signal to the first operation signal, when a result of the determination of the input determination means is negative and the result of the determination of the indicated position determination means is positive in the state where the second operation signal is used for the information processing.

Based on the above, a condition for switching operations is that the operation using the input device has not been performed. This makes it possible to prevent the operation methods from switching to each other without the user's intention.

In addition, the switching means may switch the operation signals used for the information processing from the second operation signal to the first operation signal, when the result of the determination of the input determination means is continuously negative for a predetermined time or longer and the result of the determination of the indicated position determination means is positive in the state where the second operation signal is used for the information processing.

Based on the above, a condition for switching operations is that the operation using the input device has not been performed for a predetermined time or longer. This makes it possible to prevent the operation methods from switching to each other without the user's intention.

In addition, the information processing program may further cause the computer to function as third operation signal acquisition means. The third operation signal acquisition means acquires a third operation signal output from another input device different from the pointing device and the input device. In this case, the processing means may further perform, based on the third operation signal, information processing related to the information processing. The input determination means may determine whether or not input operations have been performed on both the input device and said another input device.

Based on the above, a condition for switching operations is that an operation using another input device used for different information processing has not been performed, either. This makes it possible to prevent the operation methods from switching to each other without the user's intention.

In addition, the information processing program may further cause the computer to function as input determination means. The input determination means determines, based on the second operation signal, whether or not an input operation has been performed on the input device. In this case, the switching means may switch the operation signals used for the information processing from the first operation signal to the second operation signal, when a result of the determination of the input determination means is positive in a state where the first operation signal is used for the information processing.

Based on the above, when the operation using the input device has been performed, it is possible to quickly switch to the operation method using the input device.

In addition, the information processing program may further cause the computer to function as display control means. The display control means displays on a display device an image representing a result of the information processing performed by the processing means. In this case, the indicated position determination means may set an area corresponding to an entire display screen of the display device as the predetermined area on the plane, and may determine whether or not the indicated position has moved from out of the area corresponding to the entire display screen into the area corresponding to the entire display screen.

Based on the above, a switch is made to the operation using the pointing device by an operation of specifying the outside of the display screen and subsequently specifying the inside of the display screen, using the pointing device. This enables the user to switch the operation methods by a natural operation.

In addition, the pointing device, which outputs the first operation signal: may include an imaging section that is fixed to an input apparatus body so as to capture a periphery of the input apparatus body in a predetermined direction, or that is provided outside the input apparatus body so as to capture the input apparatus body; and may output data indicating a captured image captured by the imaging section, or indicating a result of performing a predetermined calculation on the captured image, as the first operation signal. In this case, the indicated position calculation means may calculate the indicated position based on a position of an imaging target captured in the captured image. Further, the input device: may include a direction indication section that is operated by a direction input operation of a user; and may output data indicating a direction corresponding to the direction input operation performed on the direction indication section, as the second operation signal.

Based on the above, it is possible to switch a pointing operation of pointing using the input apparatus body and a direction input operation of operating the direction indication section, in accordance with the user's intention.

In addition, the information processing program may further cause the computer to function as display control means. The display control means displays on a display device an image representing a result of the information processing performed by the processing means. In this case, the imaging target may be provided in a vicinity of the display device. Further, the imaging section may be fixed to the input apparatus body, and may capture the imaging target when the display device is present in the periphery of the input apparatus body in the predetermined direction. Furthermore, the direction indication section may be provided in the input apparatus body such that a direction input operation for an upward direction corresponds to the predetermined direction in a display image displayed on the display device.

Based on the above, it is possible to perform the direction input operation of operating the direction indication section while maintaining the orientation of the input apparatus body, with which the pointing device is operated. This eliminates the need to shift the input apparatus body when switching the operation methods.

In addition, the information processing program may further cause the computer to function as display control means. The display control means displays on a display device an image representing a result of the information processing performed by the processing means. In this case, the processing means may set a pointer indicating the indicated position when the switching means has switched the operation signals used for the information processing from the second operation signal to the first operation signal. In this case, the display control means may display on the display device the image representing the result of the information processing such that the pointer is provided at the indicated position in the image.

Based on the above, the pointer indicating the indicated position is displayed when the operation using the pointing device is performed. This enables the user to determine, by the pointer, whether or not the operation using the pointing device is valid.

In addition, the information processing program may further cause the computer to function as display control means. The display control means displays on a display device an image representing a result of the information processing performed by the processing means. In this case, the processing means may perform, as the information processing, a process of selecting, from among a plurality of options displayed on the display device, an option corresponding to the indicated position or the second operation signal.

Based on the above, in a process of selecting one of the operation using the pointing device and the operation using the input device and selecting one option from among the plurality of options, it is possible to switch the operation methods in accordance with the user's intention.

In addition, the processing means: may select, from among the plurality of options displayed on the display device, an option overlapping the indicated position, when the first operation signal is used in the information processing; and may select an option by shifting a selected option, which is selected from among the plurality of options, in a direction corresponding to a direction input operation indicated by the second operation signal, when the second operation signal is used for the information processing.

Based on the above, in the same process of selecting one option from among the plurality of options, it is possible to switch the operation using the pointing device and the operation using the input device in accordance with the user's intention.

In addition, the processing means may make a setting such that a first form mark is provided to an option selected from among the plurality of options when the second operation signal is used for the information processing. Further, the processing means: when the indicated position overlaps any of the plurality of options displayed on the display device when the first operation signal is used for the information processing, may make a setting such that the first form mark is provided to the overlapping option; and, when the indicated position overlaps none of the plurality of options displayed on the display device, may make a setting such that a mark provided to an option that has been selected until most recently is changed to a second form mark different from the first form mark. In this case, the display control means may display on the display device the image representing the result of the information processing such that the mark set by the processing means is provided to the option in the image.

Based on the above, in the operation using the pointing device, when the indicated position overlaps none of the displayed options, a mark indicating this state is provided to the option that has been selected most recently. This makes it possible to notify the user that this operation has not switched the option that has been selected most recently.

In addition, the present invention may be carried out in the form of a display control apparatus and a display control system that include the above means, and may be carried out in the form of a display control method including steps performed by the above means.

Another example of the configuration of the computer-readable storage medium having stored thereon the information processing program according to the present invention is executed by a computer of an information processing apparatus that can use operation signals output respectively from a pointing device and an input device different from the pointing device and performs predetermined information processing in accordance with the operation signals. The information processing program causes the computer to function as first operation signal acquisition means, second operation signal acquisition means, indicated position calculation means, operation mode setting means, processing means, indicated position determination means, and operation mode switching means. The first operation signal acquisition means acquires a first operation signal output from the pointing device. The second operation signal acquisition means acquires a second operation signal output from the input device. The indicated position calculation means, based on the first operation signal, calculates a position indicated on a predetermined plane. The operation mode setting means sets either one of a first operation mode where the first operation signal is used for the information processing, and a second operation mode where the second operation signal is used for the information processing. The processing means: performs the information processing based on the indicated position when the first operation mode is set by the operation mode setting means; and performs the information processing based on the second operation signal when the second operation mode is set by the operation mode setting means. The indicated position determination means determines whether or not the indicated position has moved from out of a predetermined area on the plane into the predetermined area. The operation mode switching means switches the settings made by the operation mode setting means from the second operation mode to the first operation mode, when a result of the determination of the indicated position determination means is positive in a state where the second operation mode is set by the operation mode setting means.

Based on the present invention, when predetermined information processing is performed in accordance with an operation using a pointing device and an operation using an input device different from the pointing device, it is possible to switch the operation methods in accordance with a user's intention.

These and other objects, features, aspects and advantages of the present invention will become more apparent from the following detailed description of the present invention when taken in conjunction with the accompanying drawings.

BRIEF DESCRIPTION OF THE DRAWINGS

FIG. 15 is a subroutine flow chart showing an example of a cross key operation process in step 42 of FIG. 14;

DESCRIPTION OF THE PREFERRED EMBODIMENTS

Figure 1:
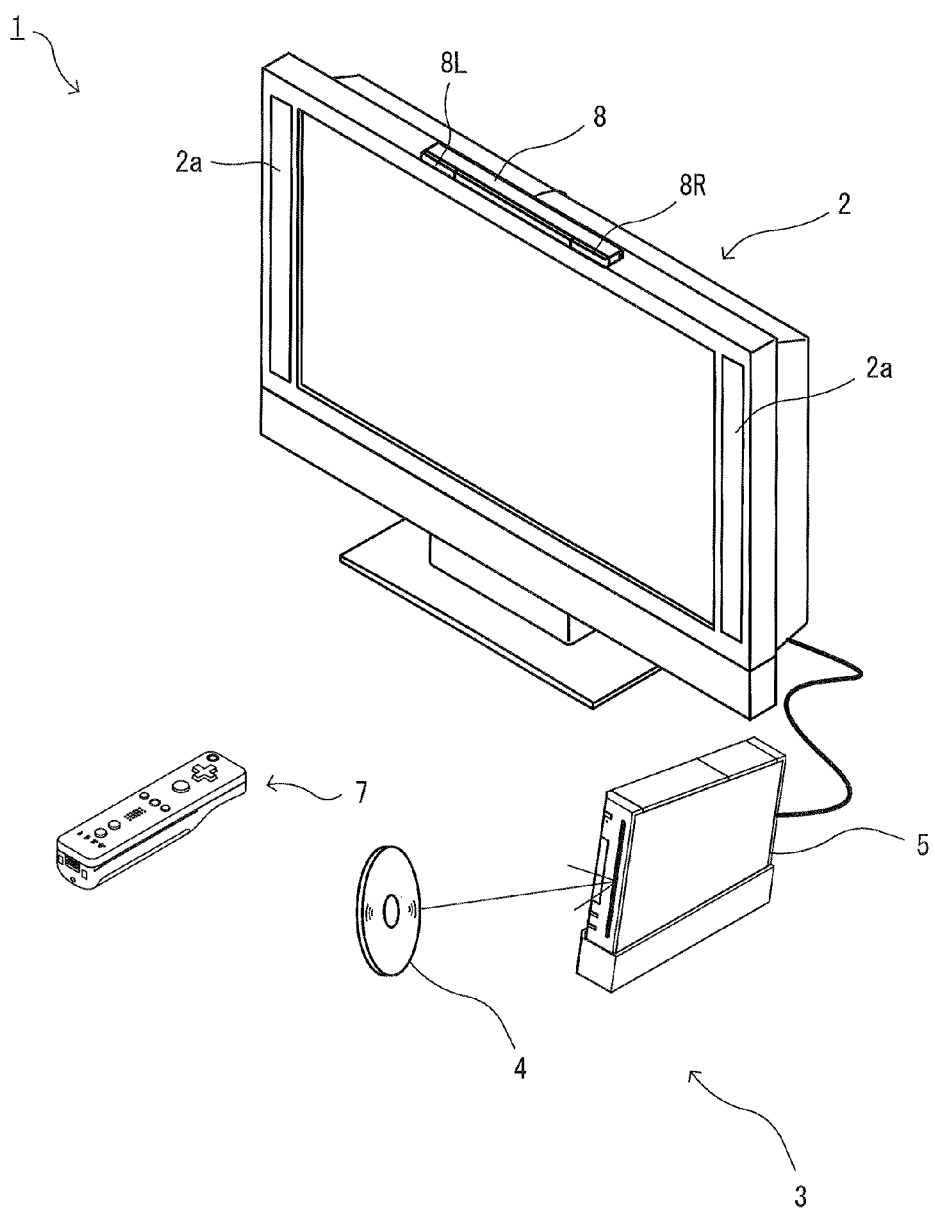
FIG. 1 is an external view of an example of a game system 1 according to an embodiment of the present invention.
Figure 2:
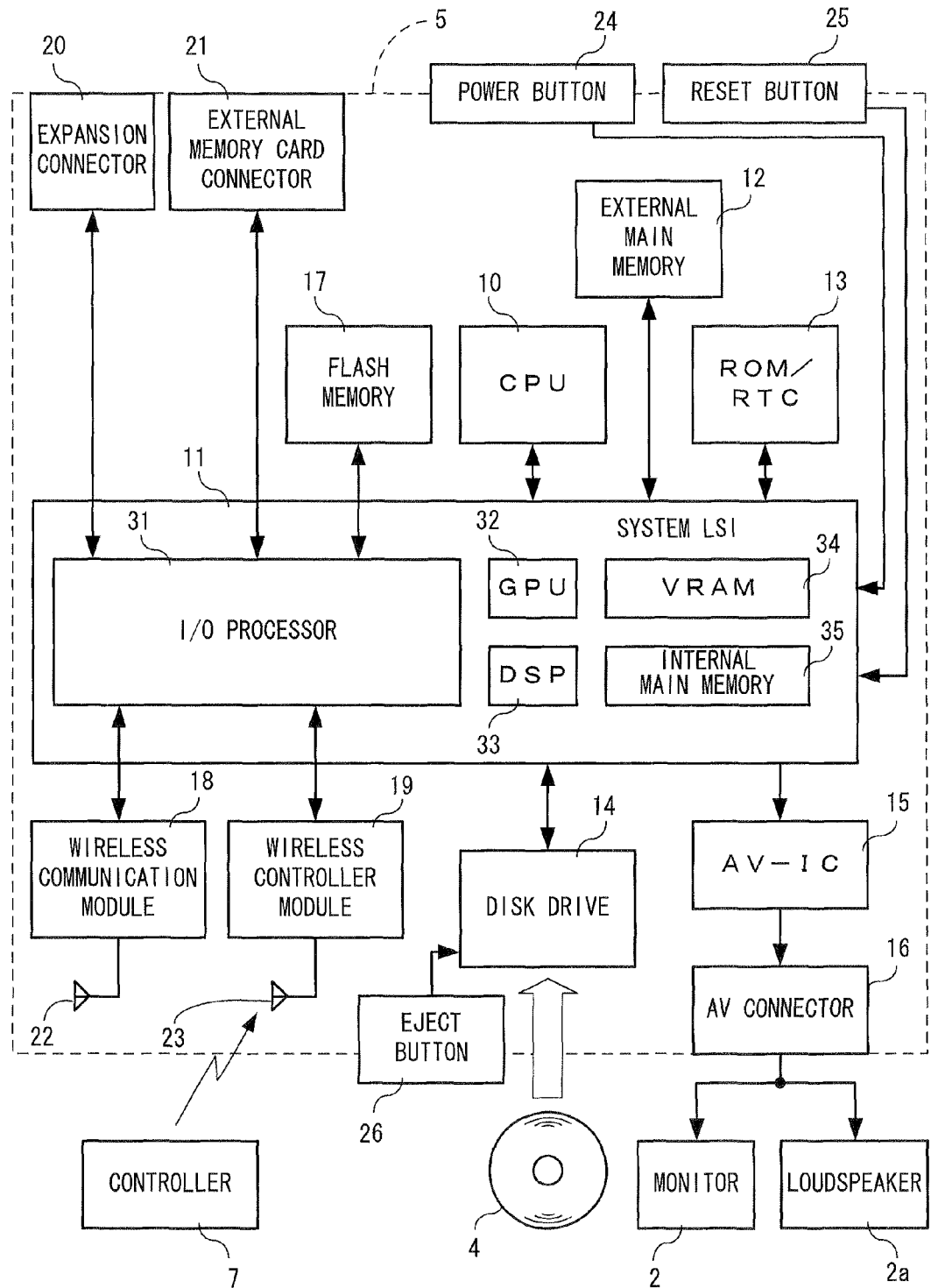
FIG. 2 is a block diagram showing an example of a game apparatus body 5 of FIG. 1.

With reference to FIG. 1, a description is given of an information processing apparatus for executing an information processing program according to an embodiment of the present invention. Hereinafter, in order to give specific descriptions, a game system including a stationary game apparatus body 5 is described using the stationary game apparatus body 5 as an example of the information processing apparatus. It should be noted that FIG. 1 is an external view of an example of a game system 1 including a stationary game apparatus 3. FIG. 2 is a block diagram showing an example of the game apparatus body 5. The game system 1 is described below.

As shown in FIG. 1, the game system 1 includes: a household television 2 (hereinafter referred to as a "monitor 2"), which is an example of display means; and the stationary game apparatus 3 connected to the monitor 2 via a connection cord. The monitor 2 includes loudspeakers 2a for outputting, in the form of sound, an audio signal output from the game apparatus 3. The game apparatus 3 includes: an optical disk 4 having stored thereon a program (e.g., a game program), which is an example of the information processing program according to the present invention; the game apparatus body 5 having a computer for executing the program of the optical disk 4 to thereby output a game screen to the monitor 2 for display; and a controller 7 for providing the game apparatus body 5 with operation information necessary for controlling an object or the like displayed on a display screen.

The game apparatus body 5 includes a wireless controller module 19 (see FIG. 2). The wireless controller module 19 receives data wirelessly transmitted from the controller 7, and transmits data from the game apparatus body 5 to the controller 7. The wireless controller module 19 thus connects the controller 7 and the game apparatus body 5 by wireless communication. Further, the optical disk 4 is detachably mounted on the game apparatus body 5, the optical disk 4 being an example of an information storage medium exchangeable in the game apparatus body 5.

On the game apparatus body 5, a flash memory 17 (see FIG. 2) is mounted. The flash memory 17 functions as a backup memory for fixedly storing therein data such as save data. The game apparatus body 5 executes a game program and the like stored on the optical disk 4, to thereby display the result of the execution as a game image and the like on the monitor 2. The game program and the like to be executed may be stored in advance not only on the optical disk 4 but also in the flash memory 17. The game apparatus body 5 may reproduce the state of a game played in the past, using the save data stored in the flash memory 17, and display an image of the reproduced game state on the monitor 2. A user of the game apparatus 3 can enjoy the progression of the game by operating the controller 7 while viewing the game image displayed on the monitor 2.

Using the technology of, for example, Bluetooth (registered trademark), the controller 7 wirelessly transmits transmission data, such as operation information, to the game apparatus body 5 including the wireless controller module 19. The controller 7 is control means mainly for controlling a player object or the like displayed on a display screen of the monitor 2, and for selecting displayed options. The controller 7 includes: a housing that is small enough to be held with one hand; and a plurality of operation buttons (including a cross key and the like) that are exposed on the surface of the housing. As will be described in detail later, the controller 7 includes an imaging information calculation section 74 for capturing an image viewed from the controller 7. As an example of imaging targets for the imaging information calculation section 74, two LED modules 8L and 8R (hereinafter referred to as "markers 8L and 8R") are placed in the vicinity of the display screen of the monitor 2. These markers 8L and 8R each output, for example, infrared light forward from the monitor 2. The controller 7 is also capable of receiving, via a communication section 75, transmission data wirelessly transmitted from the wireless controller module 19 of the game apparatus body 5, and generating a sound or vibration based on the transmission data.

Next, with reference to FIG. 2, a description is given of the internal configuration of the game apparatus body 5. FIG. 2 is a block diagram showing an example of the internal configuration of the game apparatus body 5. The game apparatus body 5 includes a central processing unit (CPU) 10, a system large scale integration (system LSI) 11, an external main memory 12, a read only memory/real time clock (ROM/RTC) 13, a disk drive 14, an audio video-integrated circuit (AV-IC) 15, and the like.

The CPU 10 performs processing by executing the program stored on the optical disk 4, and functions as a game processor. The CPU 10 is connected to the system LSI 11. In addition to the CPU 10, the external main memory 12, the ROM/RTC 13, the disk drive 14, and the AV-IC 15 are connected to the system LSI 11. The system LSI 11 performs processing such as: controlling data transfer among the components connected to the system LSI 11; generating an image to be displayed; and acquiring data from external devices. It should be noted that the internal configuration of the system LSI 11 will be described later. The external main memory 12, which is a volatile memory, stores therein a program loaded from the optical disk 4, or a program loaded from the flash memory 17, and also stores therein various pieces of data. The external main memory 12 is used as a work area or a buffer area of the CPU 10. The ROM/RTC 13 includes a ROM (a so-called boot ROM) incorporating therein a program for starting up the game apparatus body 5, and also includes a clock circuit (RTC) that counts time. The disk drive 14 reads program data, texture data, and the like from the optical disk 4, and writes the read data into an internal main memory 35 described later or into the external main memory 12.

The system LSI 11 includes an input/output processor 31, a graphic processor unit (GPU) 32, a digital signal processor (DSP) 33, a video RAM (VRAM) 34, and the internal main memory 35. Although not shown, these components 31 through 35 are connected to each other via an internal bus.

The GPU 32 is a part of drawing means, and generates an image in accordance with a graphics command (command to create an image) from the CPU 10. The VRAM 34 stores therein data (such as polygon data and texture data) that is necessary for the GPU 32 to execute the graphics command. When generating the image, the GPU 32 generates image data, using the data stored in the VRAM 34.

The DSP 33 functions as an audio processor, and generates audio data, using sound data and acoustic waveform (timbre) data stored in the internal main memory 35 and in the external main memory 12.

The image data and the audio data generated as described above are read by the AV-IC 15. The AV-IC 15 outputs the read image data to the monitor 2 via an AV connector 16, and outputs the read audio data to the loudspeakers 2a built in the monitor 2. Consequently, an image is displayed on the monitor 2, and a sound is output from the loudspeakers 2a.

The input/output processor (I/O Processor) 31 transmits/receives data to/from the components connected thereto, and downloads data from external devices. The input/output processor 31 is connected to the flash memory 17, a wireless communication module 18, the wireless controller module 19, an expansion connector 20, and an external memory card connector 21. An antenna 22 is connected to the wireless communication module 18, and an antenna 23 is connected to the wireless controller module 19.

The input/output processor 31 is connected to a network via the wireless communication module 18 and the antenna 22 so as to be able to communicate with other game apparatuses and various servers connected to the network. The input/output processor 31 regularly accesses the flash memory 17 to thereby detect the presence or absence of data that is required to be transmitted to the network. If such data is present, the data is transmitted to the network via the wireless communication module 18 and the antenna 22. The input/output processor 31 also receives, via the network, the antenna 22, and the wireless communication module 18, data transmitted from other game apparatuses or data downloaded from a download server, and stores the received data in the flash memory 17. By executing a program, the CPU 10 reads the data stored in the flash memory 17, and uses the read data for the program. The flash memory 17 may store therein save data (data stored after or during the processing) as a result of playing a game using the game apparatus body 5, as well as the data transmitted and received between the game apparatus body 5 and other game apparatuses or various servers.

The input/output processor 31 receives, via the antenna 23 and the wireless controller module 19, operation data or the like transmitted from the controller 7, and (temporarily) stores the operation data or the like in a buffer area of the internal main memory 35 or of the external main memory 12. It should be noted that, similarly to the external main memory 12, the internal main memory 35 may store therein a program loaded from the optical disk 4, or a program loaded from the flash memory 17, and also store therein various pieces of data. The internal main memory 35 may be used as a work area or a buffer area of the CPU 10.

The input/output processor 31 is connected to the expansion connector 20 and the external memory card connector 21. The expansion connector 20 is a connector for an interface such as USB and SCSI. Instead of the wireless communication module 18, the expansion connector 20 is capable of communicating with a network by being connected to a medium such as an external storage medium, to a peripheral device such as another controller, or to a connector for wired communication. The external memory card connector 21 is a connector for connection to an external storage medium such as a memory card. For example, the input/output processor 31 is capable of accessing an external storage medium via the expansion connector 20 or the external memory card connector 21 to thereby store data into or read data from the external storage medium.

The game apparatus body 5 includes (e.g., on the front main surface thereof): a power button 24 of the game apparatus body 5; a reset button 25 for resetting game processing; an insertion slot for detachably mounting the optical disk 4; an eject button 26 for ejecting the optical disk 4 from the insertion slot of the game apparatus body 5; and the like. The power button 24 and the reset button 25 are connected to the system LSI 11. When the power button 24 is turned on, each component of the game apparatus body 5 is supplied with power via an AC adaptor (not shown). When the reset button 25 is pressed, the system LSI 11 re-executes the boot program of the game apparatus body 5. The eject button 26 is connected to the disk drive 14. When the eject button 26 is pressed, the optical disk 4 is ejected from the disk drive 14.

Figure 3:
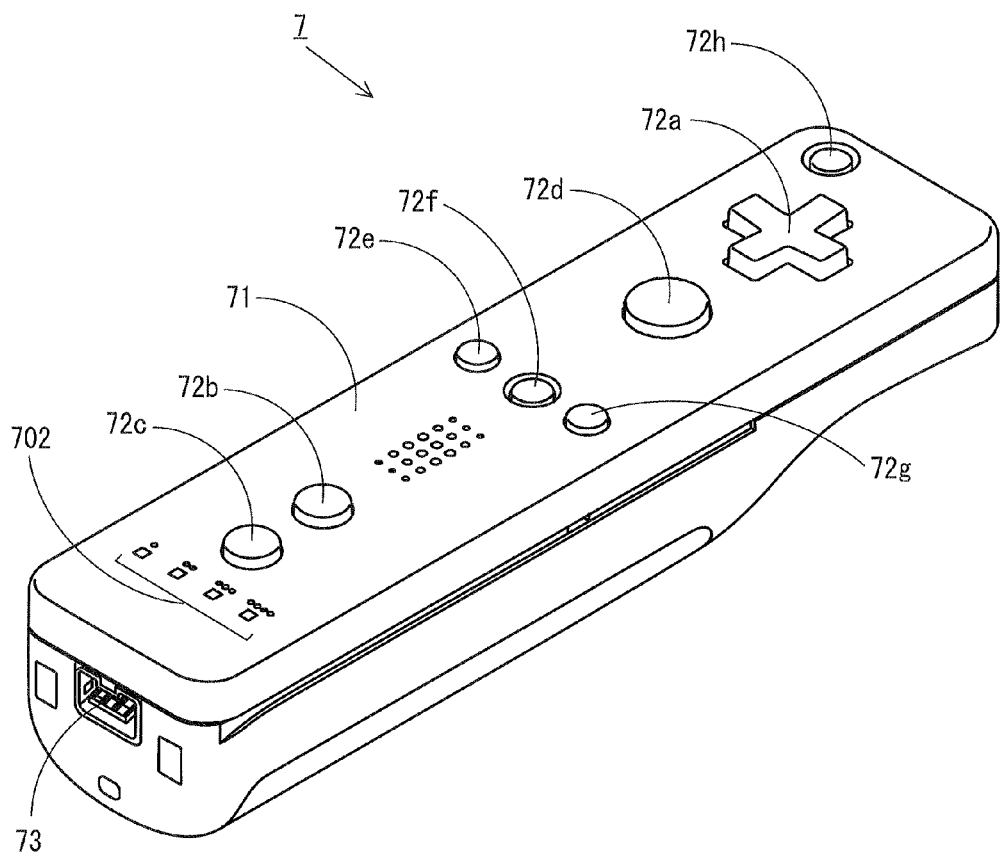
FIG. 3 is a perspective view of a controller 7 of FIG. 1 viewed from the top rear side thereof.
Figure 4:
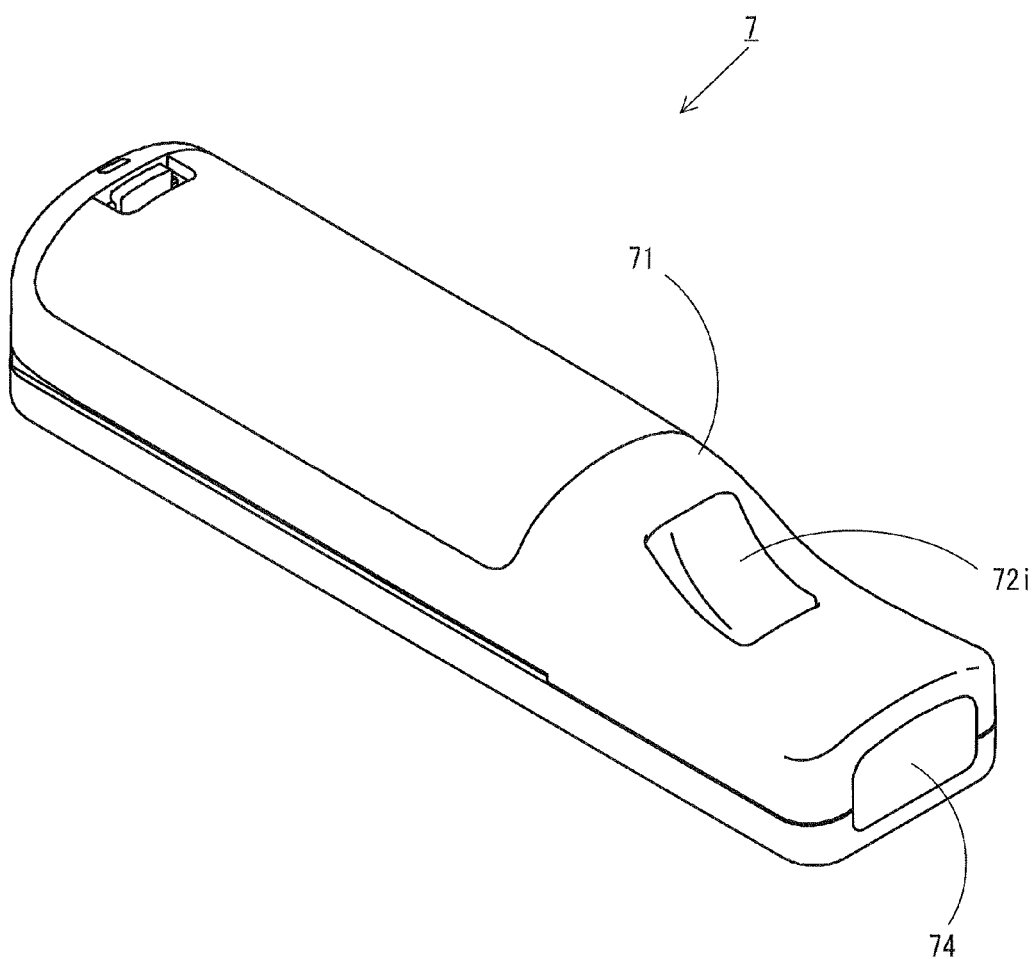
FIG. 4 is a perspective view of the controller 7 of the FIG. 3 viewed from the bottom front side thereof.

With reference to FIGS. 3 and 4, the controller 7 is described. It should be noted that FIG. 3 is a perspective view of an example of the controller 7 viewed from the top rear side thereof. FIG. 4 is a perspective view of an example of the controller 7 viewed from the bottom front side thereof.

Referring to FIGS. 3 and 4, the controller 7 includes a housing 71 formed by, for example, plastic molding. The housing 71 has a plurality of operation sections 72 provided thereon. The housing 71 is of a generally parallelepiped shape extending in the longitudinal direction from front to rear. The overall size of the housing 71 is small enough to be held with one hand by an adult or even a child.

At the center of the anterior part of the top surface of the housing 71, a cross key 72a is provided. The cross key 72a is a cross-shaped four-direction push switch. The cross key 72a includes operation portions corresponding to four directions, namely top, bottom, right, and left (front, rear, right, and left), placed on the respective projecting portions of the cross shape, the projecting portions arranged at 90 degree intervals. The user selects one of the front, rear, right, and left directions by pressing one of the operation portions of the cross key 72a. Through the operation of the cross key 72a, the user can, for example, instruct an object or the like appearing in a virtual world to move in the indicated direction, or give an instruction to select one of multiple options.

It should be noted that the cross key 72a is an operation section for outputting an operation signal in accordance with the direction input operation described above performed by the user. Such an operation section, however, may be provided in another form. For example, an operation section may be provided that has four push switches arranged in a cross formation and outputs an operation signal in accordance with the pressing of one of the push switches by user. Alternatively, an operation section may be provided that has a composite switch including, as well as the above four push switches, a center switch provided at the intersection point of the above cross formation. Yet alternatively, the cross key 72a may be replaced by an operation section that includes an inclinable stick (a so-called joystick) projecting from the top surface of the housing 71 and outputs an operation signal in accordance with the inclining direction of the stick. Yet alternatively, the cross key 72a may be replaced by an operation section that includes a horizontally-slidable disk-shaped member and outputs an operation signal in accordance with the sliding direction of the disk-shaped member. Yet alternatively, the cross key 72a may be replaced by a touch pad.

Posterior to the cross key 72a on the top surface of the housing 71, a plurality of operation buttons 72b through 72g are provided. The operation buttons 72b through 72g are operation sections for, when the user presses the head of each button, outputting an operation signal assigned to the button. For example, the operation buttons 72b through 72d are assigned the functions of a first button, a second button, and an A button, respectively. Further, for example, the operation buttons 72e through 72g are assigned the functions of a minus button, a home button, and a plus button, respectively. These operation buttons 72a through 72g are assigned the respective operation functions in accordance with the program executed by the game apparatus body 5. It should be noted that in the exemplary arrangement shown in FIG. 3, the operation buttons 72b through 72d are arranged in a line in the front-rear direction, in the center on the top surface of the housing 71. Furthermore, the operation buttons 72e through 72g are arranged in a line in the left-right direction, between the operation buttons 72b and 72d on the top surface of the housing 71. The operation button 72f has the top surface thereof buried in the top surface of the housing 71, so as not to be inadvertently pressed by the user.

Anterior to the cross key 72a on the top surface of the housing 71, an operation button 72h is provided. The operation button 72h is a power switch for remotely turning on/off the game apparatus body 5. The operation button 72h also has the top surface thereof buried in the top surface of the housing 71, so as not to be inadvertently pressed by the user.

Posterior to the operation button 72c on the top surface of the housing 71, a plurality of LEDs 702 are provided. Here, the controller 7 is assigned a controller type (number) so as to be distinguishable from other controllers. The LEDs 702 are used, for example, to inform the user of the controller type presently set for the controller 7. Specifically, a signal is transmitted from the wireless controller module 19 to the controller 7 such that one of the plurality of LEDs 702 that corresponds to the controller type of the controller 7 is lit on.

On the top surface of the housing 71, sound holes are formed between the operation button 72b and the operation buttons 72e through 72g, so as to output sounds to the outside of the housing 71 from a loudspeaker (a loudspeaker 706 shown in FIG. 5) described later.

On the bottom surface of the housing 71, a recessed portion is formed. The recessed portion on the bottom surface of the housing 71 is formed in the position where the index finger or the middle finger of the user is placed when the user holds the controller 7 with one hand so as to point at the front surface of the housing 71 to the markers 8L and 8R. On a slope surface of the recessed portion, an operation button 72i is provided. The operation button 72i is an operation section that functions as, for example, a B button.

On the front surface of the housing 71, an image pickup device 743 is provided that is a part of the imaging information calculation section 74. Here, the imaging information calculation section 74 is a system for: analyzing image data of an image captured by the controller 7; discriminating an area having a high brightness in the image; and detecting the position of the center of gravity, the size, and the like of the area. The imaging information calculation section 74 has, for example, a maximum sampling period of approximately 200 frames/sec., and therefore is capable of tracing and analyzing even a relatively fast movement of the controller 7. A detailed configuration of the imaging information calculation section 74 will be described later. On the rear surface of the housing 71, a connector 73 is provided. The connector 73 is, for example, an edge connector, and is used to engage and connect the controller 7 with, for example, a connection cable.

Figure 5:
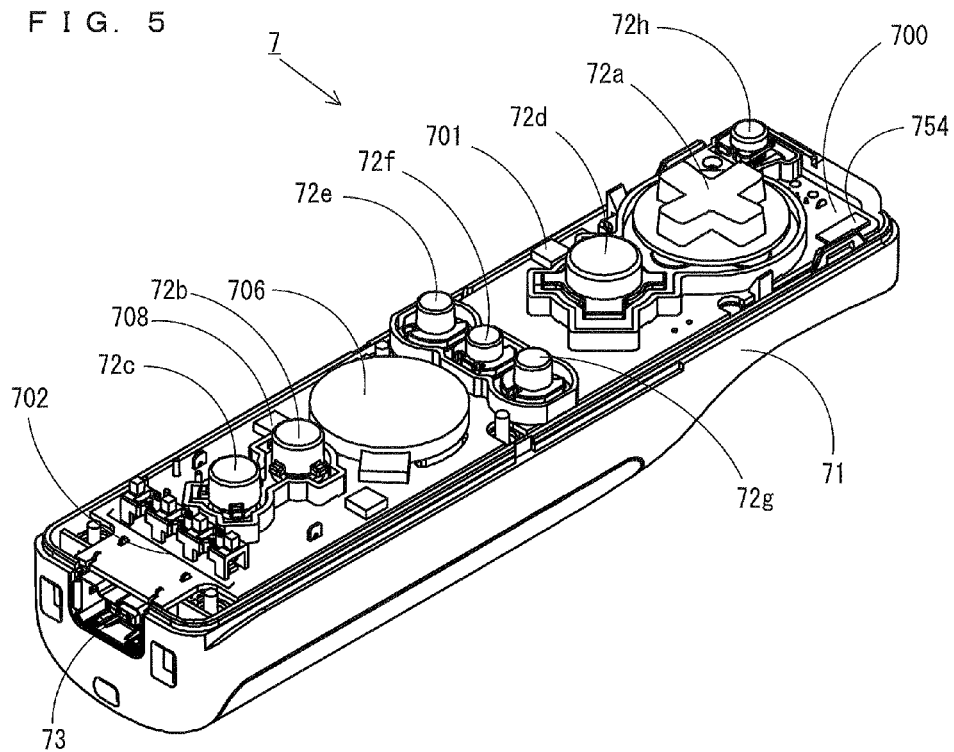
FIG. 5 is a perspective view of the controller 7 of FIG. 3, with an upper casing thereof removed.
Figure 6:
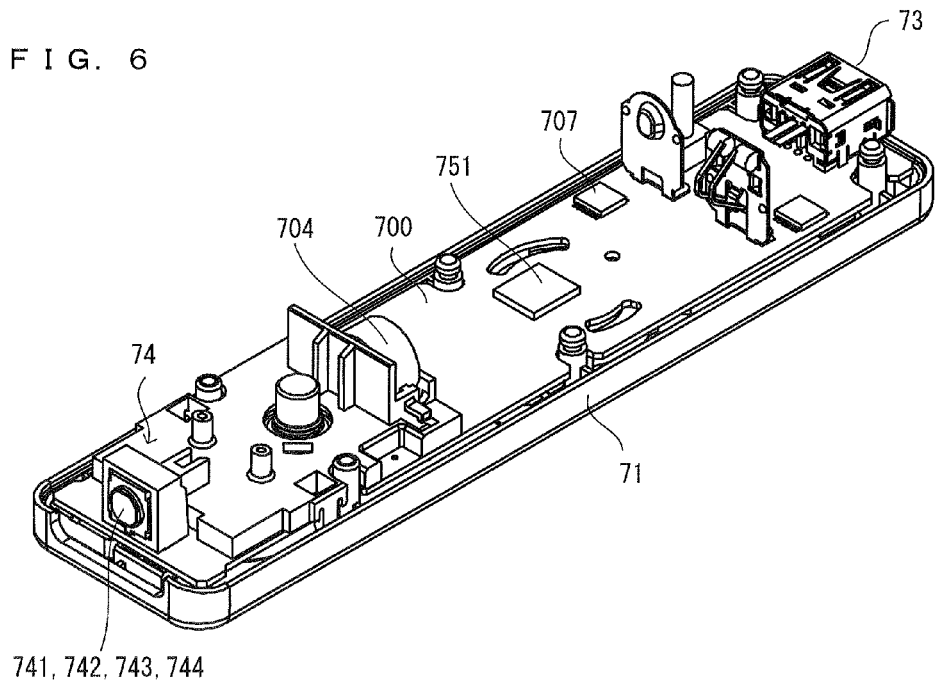
FIG. 6 is a perspective view of the controller 7 of FIG. 4, with a lower casing thereof removed.

Next, with reference to FIGS. 5 and 6, a description is given of the internal structure of the controller 7. It should be noted that FIG. 5 is a perspective view of an example of the controller 7 viewed from the rear surface side thereof, with an upper casing thereof (a part of the housing 71) removed. FIG. 6 is a perspective view of an example of the controller 7 viewed from the front surface side thereof, with a lower casing thereof (a part of the housing 71) removed. Here, FIG. 6 shows the reverse side of a substrate 700 shown in FIG. 5.

As shown in FIG. 5, the substrate 700 is fixed within the housing 71. On the top main surface of the substrate 700, the operation buttons 72a through 72h, an acceleration sensor 701, the LEDs 702, an antenna 754, and the like are provided. These components are connected to, for example, a microcomputer 751 (see FIGS. 6 and 7) via wires (not shown) formed on the substrate 700 and the like. A wireless module 753 (see FIG. 7) and the antenna 754 allow the controller 7 to function as a wireless controller. It should be noted that a quartz oscillator (not shown) is provided within the housing 71, and generates a reference clock of the microcomputer 751 described later. Furthermore, on the top main surface of the substrate 700, the loudspeaker 706 and an amplifier 708 are provided. The acceleration sensor 701 is provided on the substrate 700, to the left of the operation button 72d (i.e., provided not in the central part but in the peripheral part of the substrate 700). Accordingly, in accordance with the rotation of the controller 7 about the axis of the longitudinal direction thereof, the acceleration sensor 701 is capable of detecting, in addition to a change in the direction of the gravitational acceleration, acceleration containing a centrifugal component. Thus, using the detected acceleration data, the game apparatus body 5 or the like can determine the movement of the controller 7 by predetermined calculations with excellent sensitivity.

Referring to FIG. 6, at the front edge of the bottom main surface of the substrate 700, the imaging information calculation section 74 is provided. The imaging information calculation section 74 includes an infrared filter 741, a lens 742, the image pickup device 743, and an image processing circuit 744, these components placed in this order starting from the front surface of the controller 7 and attached to the bottom main surface of the substrate 700. At the rear edge of the bottom main surface of the substrate 700, the connector 73 is attached. Further, on the bottom main surface of the substrate 700, a sound IC 707 and the microcomputer 751 are provided. The sound IC 707 is connected to the microcomputer 751 and the amplifier 708 via wires formed on the substrate 700 and the like, and outputs an audio signal to the loudspeaker 706 via the amplifier 708 in accordance with sound data transmitted from the game apparatus body 5. On the bottom main surface of the substrate 700, a vibrator 704 is attached. The vibrator 704 is connected to the microcomputer 751 via wires formed on the substrate 700 and the like, and is turned on/off in accordance with vibration data transmitted from the game apparatus body 5.

Figure 7:
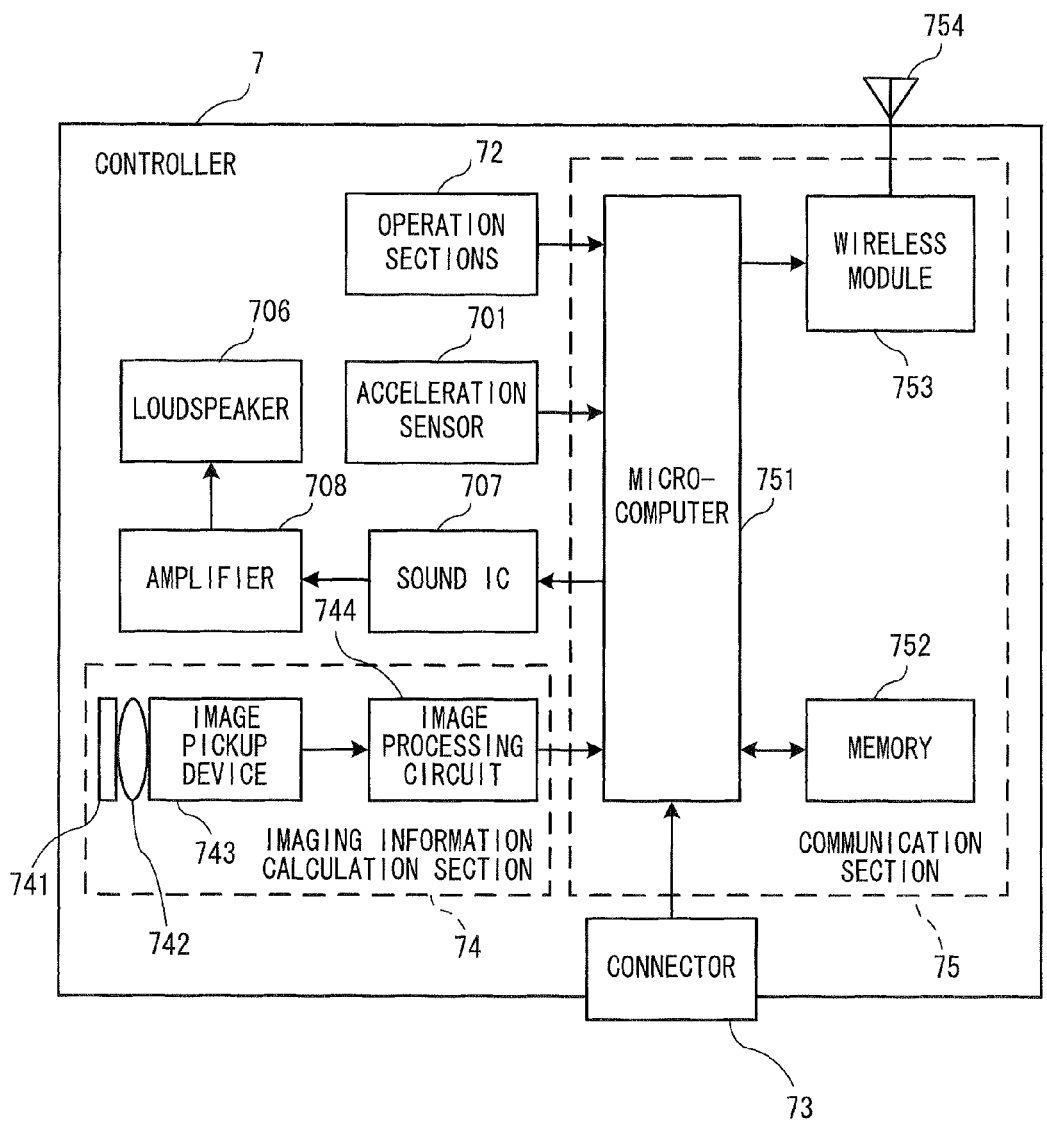
FIG. 7 is a block diagram showing the internal configuration of the controller 7 of FIG. 3.

Next, with reference to FIG. 7, a description is given of the internal configuration of the controller 7. It should be noted that FIG. 7 is a block diagram showing an example of the internal configuration of the controller 7.

Referring to FIG. 7, the controller 7 includes the communication section 75, as well as the operation sections 72, the imaging information calculation section 74, the acceleration sensor 701, the loudspeaker 706, the sound. IC 707, and the amplifier 708 that are described above.

The imaging information calculation section 74 includes the infrared filter 741, the lens 742, the image pickup device 743, and the image processing circuit 744. The infrared filter 741 passes only infrared light, among the light incident thereon through the front surface of the controller 7. The lens 742 collects the infrared light that has passed through the infrared filter 741, and emits the collected infrared light to the image pickup device 743. The image pickup device 743 is a solid-state image pickup device such as a CMOS sensor and a CCD. The image pickup device 743 captures the infrared light collected by the lens 742. That is, the image pickup device 743 captures only the infrared light that has passed through the infrared filter 741, and generates image data of the image. The image data generated by the image pickup device 743 is processed by the image processing circuit 744. Specifically, the image processing circuit 744 processes the image data obtained from the image pickup device 743, and senses an area having a high brightness in the image, and outputs to the communication section 75 processing result data indicating the result of the detection of the position coordinates, the square measure, and the like of the area. It should be noted that the imaging information calculation section 74 is fixed to the housing 71 of the controller 7. This makes it possible to change the imaging direction of the imaging information calculation section 74 by changing the orientation of the housing 71 per se.

The communication section 75 includes the microcomputer 751, a memory 752, the wireless module 753, and the antenna 754. While using the memory 752 as a storage area during processing, the microcomputer 751 controls the wireless module 753 that wirelessly transmits transmission data. The microcomputer 751 also controls the operations of the sound IC 707 in accordance with data received by the wireless module 753 from the game apparatus body 5 via the antenna 754. The sound IC 707 processes sound data or the like transmitted from the game apparatus body 5 via the communication section 75.

The following are output to the microcomputer 751: operation signals (key data) from the operation sections 72 provided on the controller 7; acceleration signals (X-axis, Y-axis, and Z-axis direction acceleration data) about the three axial directions from the acceleration sensor 701; and the processing result data from the imaging information calculation section 74. The microcomputer 751 temporarily stores the input data (the key data, the X-axis, Y-axis, and Z-axis direction acceleration data, and the processing result data) in the memory 752 as transmission data to be transmitted to the wireless controller module 19. Here, the wireless transmission from the communication section 75 to the wireless controller module 19 is performed at predetermined time intervals. Game processing is generally performed in a cycle of 1/60 sec., and therefore, the wireless transmission needs to be performed in a shorter cycle. Specifically, game processing is performed in a cycle of 16.7 ms (1/60 sec.), and the transmission interval of the communication section 75 configured using the Bluetooth (registered trademark) technology is 5 ms. At the time of performing transmission to the wireless controller module 19, the microcomputer 751 outputs to the wireless module 753 the transmission data, stored in the memory 752, as a series of pieces of operation information. With the use of, for example, the Bluetooth (registered trademark) technology, the wireless module 753 modulates the operation information using a carrier wave of a predetermined frequency, and radiates from the antenna 754 a radio signal indicating the operation information. That is, the key data from the operation sections 72 provided on the controller 7, the X-axis, Y-axis, and Z-axis direction acceleration data from the acceleration sensor 701, and the processing result data from the imaging information calculation section 74 are transmitted from the controller 7. The wireless controller module 19 of the game apparatus body 5 receives the radio signal, and the game apparatus body 5 demodulates and decodes the radio signal to thereby acquire the series of pieces of operation information (the key data, the X-axis, Y-axis, and Z-axis direction acceleration data, and the processing result data). Based on the acquired operation information and the program, the CPU 10 of the game apparatus body 5 performs processing. It should be noted that when configured using the Bluetooth (registered trademark) technology, the communication section 75 can also have the function of receiving transmission data wirelessly transmitted from other devices.

Figure 8:
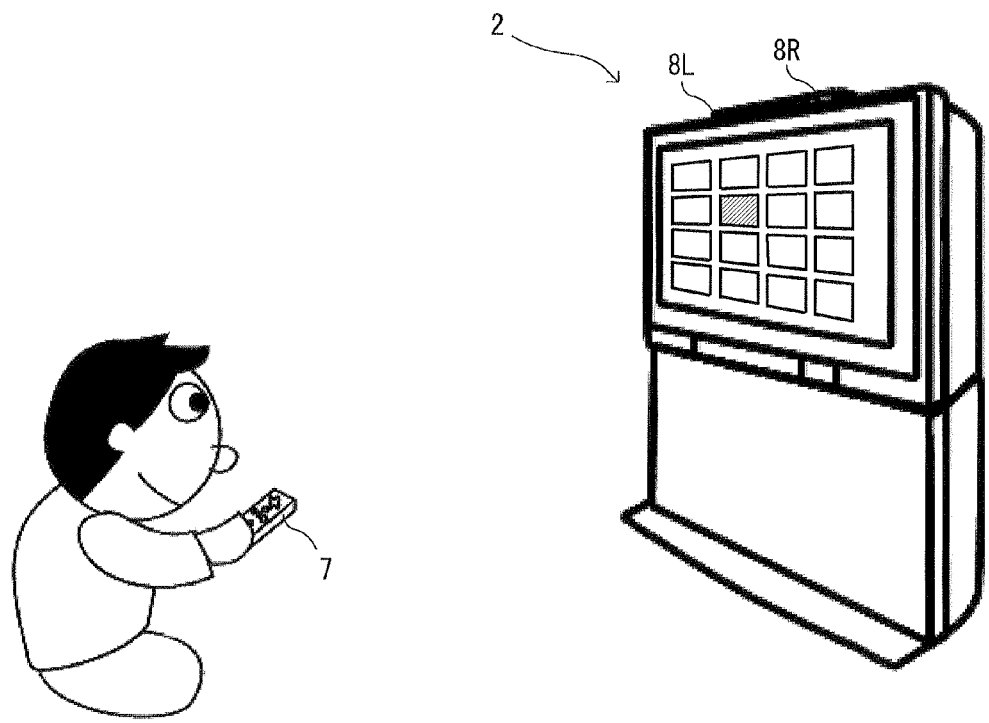
FIG. 8 is a schematic diagram outlining an example of the state where a user performs an operation using the controller 7 of FIG. 1.

Here, as shown in FIG. 8, to play a game using the controller 7 in the game system 1, the user holds the controller 7 with one hand (e.g., right hand). The user holds the controller 7 such that the front surface of the controller 7 (the side on which the light captured by the imaging information calculation section 74 is incident) faces the monitor 2. Meanwhile, in the vicinity of the display screen of the monitor 2, the two markers 8L and 8R are placed. The markers 8L and 8R each emit infrared light forward from the monitor 2, and serve as an imaging target for the imaging information calculation section 74.

Figure 9:
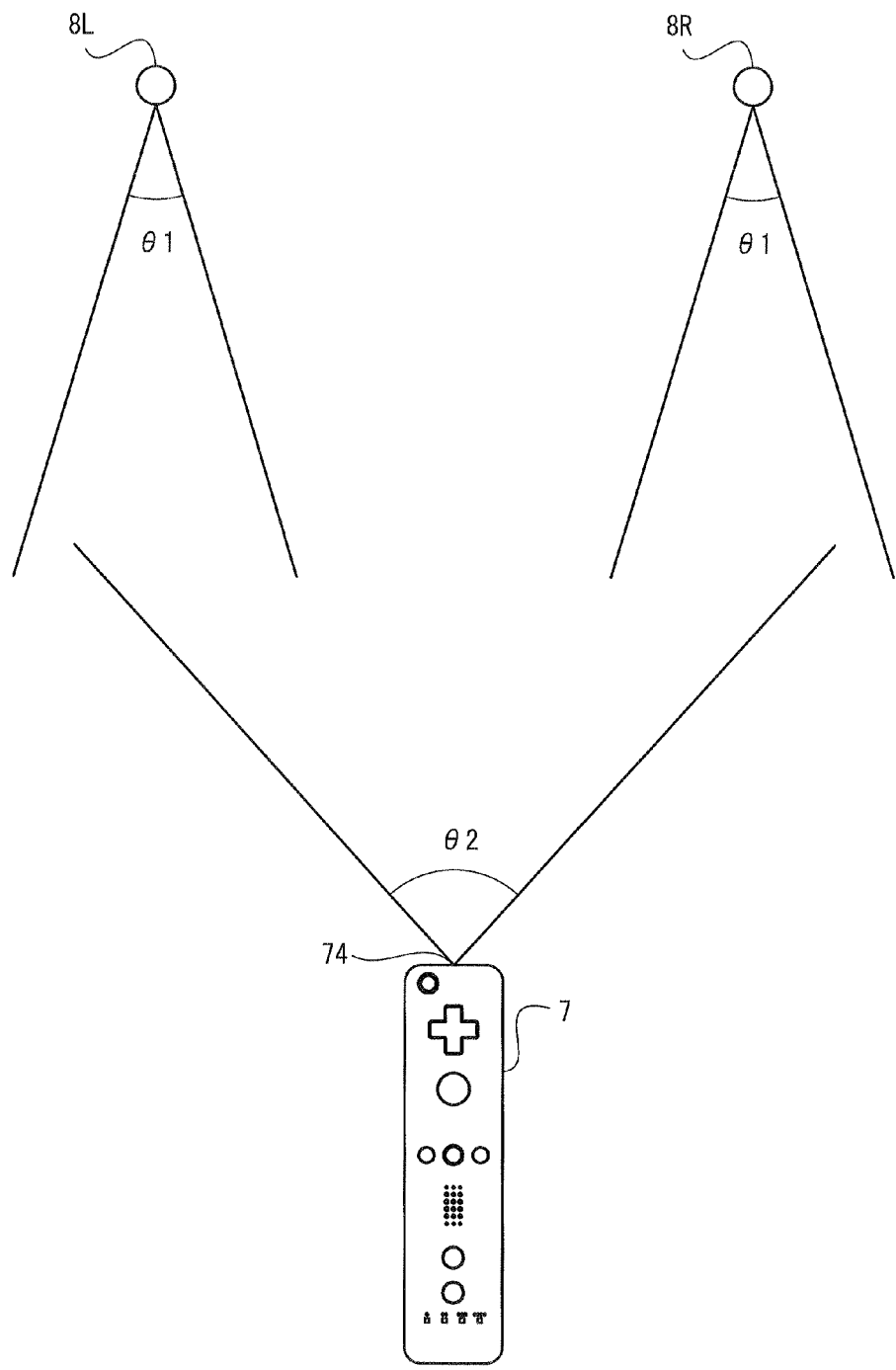
FIG. 9 is a diagram illustrating an example of the viewing angles of markers 8L and 8R and an imaging information calculation section 74.

As shown in FIG. 9, the markers 8L and 8R each have a viewing angle θ1. Further, the image pickup device 743 has a viewing angle θ2. For example, the viewing angles θ1 of the markers 8L and 8R each are 34° (half angle), and the viewing angle θ2 of the image pickup device 743 is 41°. When both the markers 8L and 8R are present in the viewing angle θ2 of the image pickup device 743 and the image pickup device 743 is present both in the viewing angle θ1 of the marker 8L and in the viewing angle θ1 of the marker 8R, the game apparatus body 5 calculates the position pointed at by the controller 7, using position data regarding high-brightness points determined based on the two makers 8L and 8R.

For example, when the player holds the controller 7 such that its front surface is directed to the monitor 2, the infrared lights output from the two markers 8L and 8R are incident on the imaging information calculation section 74. The image pickup element 743 captures the incident infrared lights via the infrared filter 741 and the lens 742, and the image processing circuit 744 processes the captured image. Here, the imaging information calculation section 74 detects the components of the infrared lights output from the markers 8L and 8R, to thereby acquire position information (the positions of target images) and the like of the markers 8L and 8R in the captured image. Specifically, the image processing circuit 744 analyzes image data of the image captured by the image pickup element 743, to thereby first eliminate, from area information of the captured image, images that cannot be generated by the infrared lights output from the markers 8L and 8R, and then determine that high-brightness points are the positions of the markers 8L and 8R, respectively. The imaging information calculation section 74 acquires position information such as the positions of the centers of gravity of the determined high-brightness points, and outputs the position information as the processing result data. Here, the position information, which is the processing result data, may be output as coordinate values whose origin is a predetermined reference point on the captured image (e.g., the center, or the top left corner, of the captured image). Alternatively, using the positions of high-brightness points at a predetermined time as reference points, the differences between the reference points and the positions of the current high-brightness points may be output as vectors. That is, in the case where a predetermined reference point is set on the captured image captured by the image pickup element 743, the position information of the target images is parameters used as the differences between the positions of the target images and the reference point. Such position information is transmitted to the game apparatus body 5, whereby, on the basis of the differences between the reference point and the position information, the game apparatus body 5 can obtain variations in a signal in accordance with the movement, the orientation, the position, and the like of the imaging information calculation section 74, i.e., the controller 7, relative to the markers 8L and 8R. Specifically, when the controller 7 is moved, the positions of the centers of gravity of the high-brightness points in the image transmitted from the communication section 75 change. Thus, the direction and the coordinates may be input in accordance with the changes in the positions of the centers of gravity of the high-brightness points, whereby it is possible to use the position pointed at by the controller 7, as an operation input, and also possible to input the direction and the coordinates in accordance with the moving direction of the controller 7. It should be noted that in an example of information processing described later, the imaging information calculation section 74 at least acquires the coordinates of the position of the center of gravity of each of the target images of the markers 8L and 8R in a captured image, and outputs the coordinates as the processing result data.

As described above, the imaging information calculation section 74 of the controller 7 captures the markers (the infrared lights from the markers 8L and 8R, in this embodiment) that are fixedly placed, whereby in the processing performed by the game apparatus body 5, it is possible to perform an operation in accordance with the movement, the orientation, the position, and the like of the controller 7 by processing data output from the controller 7. This makes it possible to perform an intuitive operation input, which is different from an input performed by pressing an operation button or an operation key. Further, as described above, the markers are placed in the vicinity of the display screen of the monitor 2, and therefore, it is also possible to easily convert a position relative to the markers into the movement, the orientation, the position, and the like of the controller 7 relative to the display screen of the monitor 2. That is, it is possible to use the processing result data based on the movement, the orientation, the position, and the like of the controller 7, as an operation input directly reflected on the display screen of the monitor 2 (e.g., input the position pointed at by the controller 7).

Figure 10:
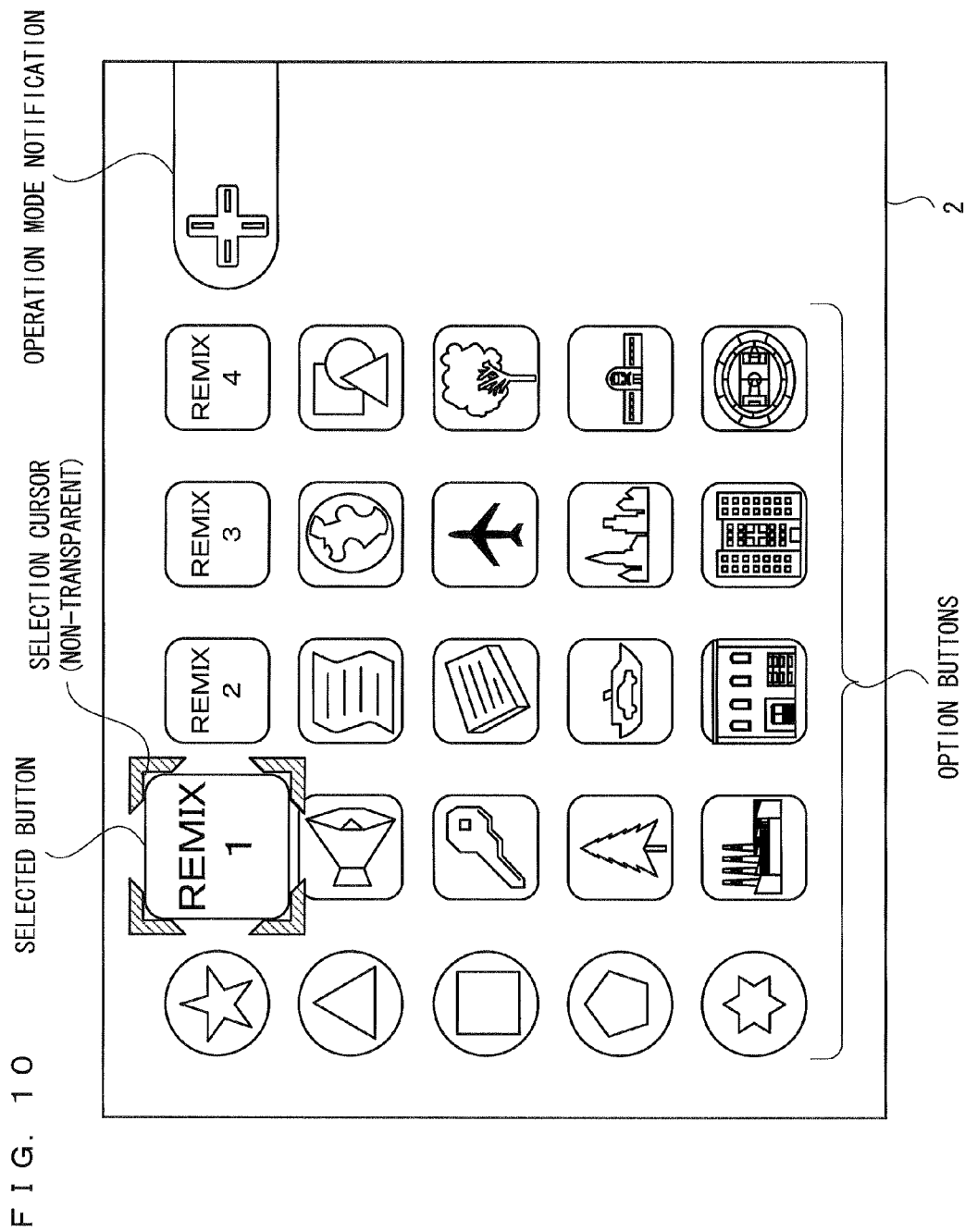
FIG. 10 is a schematic diagram outlining an example of an image displayed on a monitor 2 in a cross key operation mode.
Figure 11:
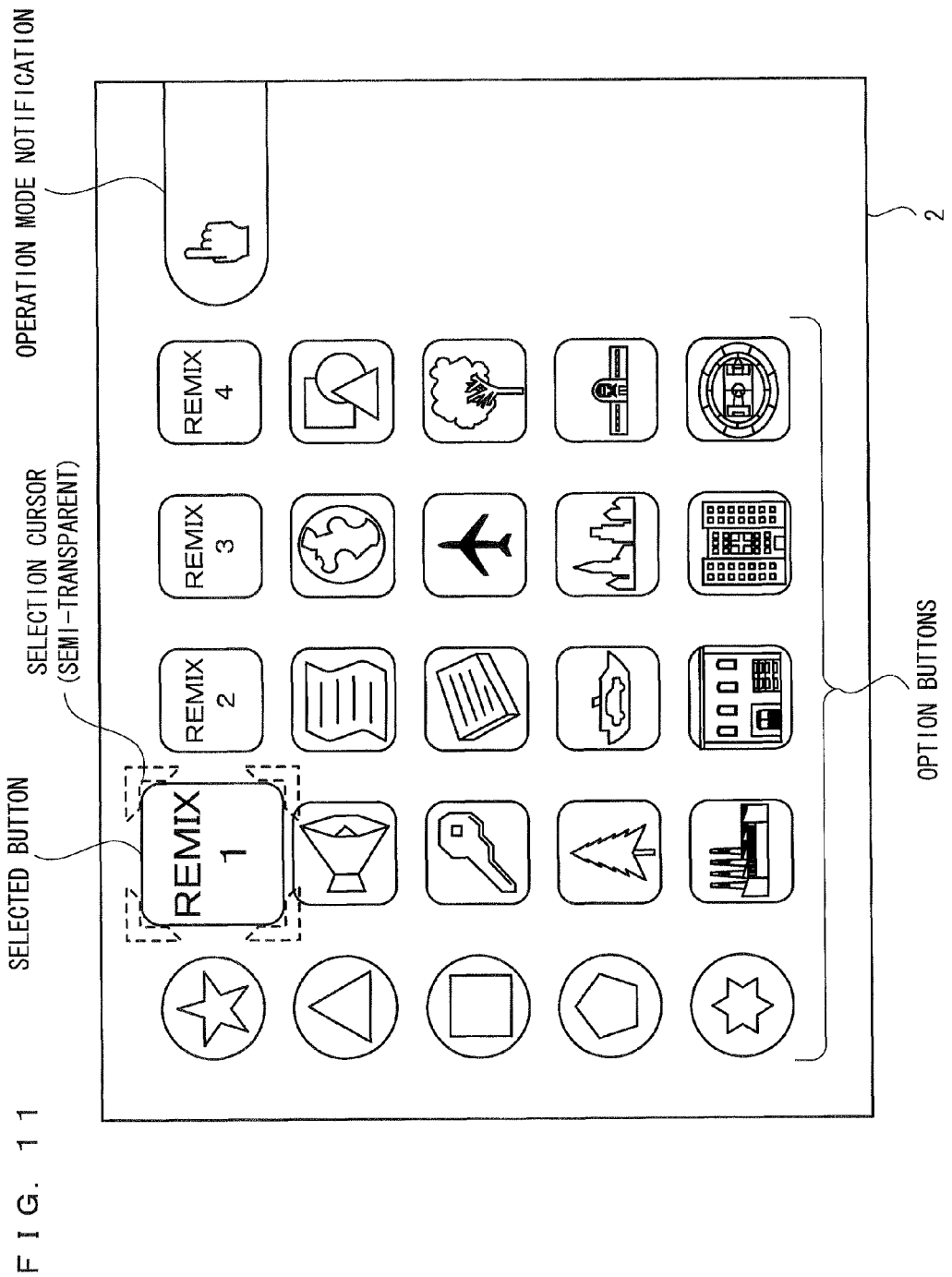
FIG. 11 is a schematic diagram outlining an example of an image displayed on the monitor 2 in the pointing operation mode.
Figure 12:
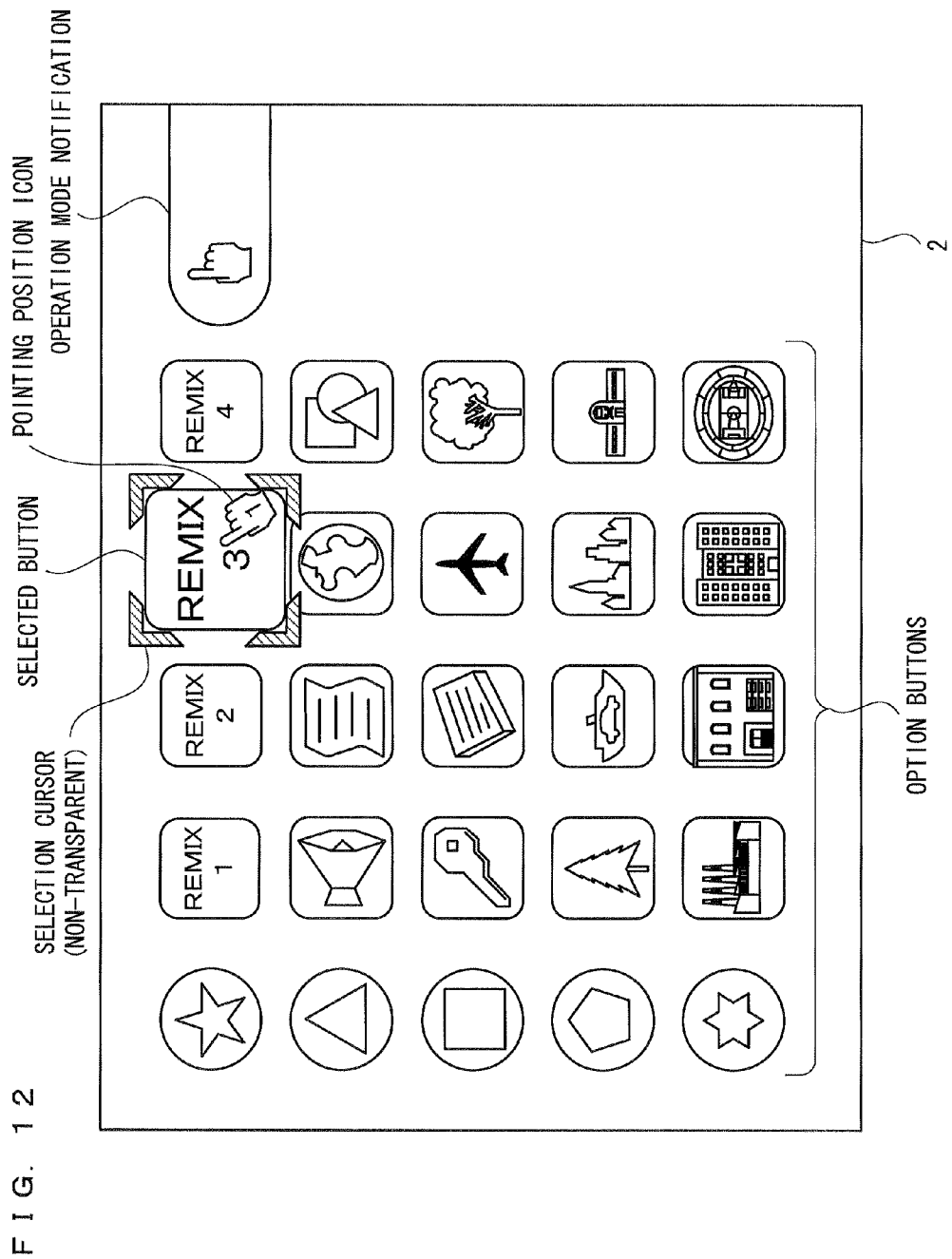
FIG. 12 is a schematic diagram outlining another example of the image displayed on the monitor 2 in the pointing operation mode.

Next, with reference to FIGS. 10 through 12, a description is given of an overview of information processing performed by the game apparatus body 5, before descriptions are given of specific processes performed by the game apparatus body 5. FIG. 10 is a schematic diagram outlining an example of an image displayed on the monitor 2 in a cross key operation mode. FIG. 11 is a schematic diagram outlining an example of an image displayed on the monitor 2 in a pointing operation mode. FIG. 12 is a schematic diagram outlining another example of the image displayed on the monitor 2 in the pointing operation mode. In the following descriptions, as an example, the user performs an, operation of making a selection from among a plurality of option buttons displayed on the monitor 2 and making a determination, using the controller 7.

In FIGS. 10 through 12, a plurality of option buttons for prompting the user to perform a selection operation are displayed on the monitor 2. The user performs an operation of selecting and determining an option button, whereby the game apparatus body 5 performs information processing indicated by the determined option button. It should be noted that in the following descriptions, an option button that is selected from among the plurality of option buttons by the user is referred to simply as a "selected button".

The user can perform an operation of indicating a selected button from among the plurality of option buttons displayed on the monitor 2, using the controller 7. Here, in the selection operation of indicating a selected button from among the plurality of option buttons, the following are prepared: a selection operation mode where the user performs a pressing operation on the operation button 72*a* (cross key) of the controller 7 (a cross key operation mode); and a selection operation mode where the user points at the display screen of the monitor 2 using the controller 7 (a pointing operation mode).

In FIG. 10, when the game apparatus body 5 is operating in the cross key operation mode, an operation mode notification having, for example, a mark representing a cross key, is displayed on the monitor 2 in order to notify the user that the operation mode is the cross key operation mode. Further, the selected button that is selected at this time is provided with a selection cursor in its periphery as a mark indicating the selected button, and is displayed in an enlarged manner relative to the other option buttons. This enables the user to recognize that the option button provided with the selection cursor and displayed in an enlarged manner is the selected button that is currently selected. For example, the selection cursor includes a non-transparent frame image that surrounds at least part of the selected button, and is displayed on the monitor 2. It should be noted that in the present embodiment, the state of being displayed neither transparent nor semi-transparent on the monitor 2 is defined as "non-transparent". In FIG. 10, a diagonal line area indicates that the frame image of the selection cursor is non-transparent. It should be noted that the operation mode notification indicating the cross key operation mode may be displayed for a certain time immediately after the operation mode has switched to the cross key operation mode and may then be hidden, or the operation mode notification indicating the cross key operation mode may always be displayed while the operation mode is the cross key operation mode.

In the cross key operation mode, when the user has pressed any of the directions of the operation button 72*a*, selected buttons are switched in accordance with the pressed direction. For example, when the user has pressed the right direction of the operation button 72*a*, the option button arranged to the right of the selected button that has been selected before the pressing becomes a selected button. Then, the selection cursor provided to the selected button that has been selected before the pressing moves to the periphery of the option button arranged to the right, and the option button is displayed in an enlarged manner, whereby it is indicated to the user that a newly selected button has been selected. On the other hand, from the periphery of the previously selected button that has been selected before the pressing operation, the selection cursor is removed, and the enlarged display of the previously selected button is canceled. Thus, the display form of the previously selected button returns to one similar to those of the other option buttons, whereby it is indicated that the previously selected button has been removed from the selection of the user.

In FIGS. 11 and 12, when the game apparatus body 5 is operating in the pointing operation mode, an operation mode notification having, for example, a mark representing a pointing hand, is displayed on the monitor 2 in order to notify the user that the operation mode is the pointing operation mode. Further, similarly to the cross key operation mode, the selected button that is selected at this time is provided with a selection cursor in its periphery, and is displayed in an enlarged manner relative to the other option buttons. Also in the pointing operation mode, this enables the user to recognize that the option button provided with the selection cursor and displayed in an enlarged manner is the selected button that is currently selected. Additionally, in the pointing operation mode, a pointing position icon is displayed on the monitor 2 as a pointer indicating the position pointed at by the controller 7 (see FIG. 12). It should be noted that the operation mode notification indicating the pointing operation mode may be displayed for a certain time immediately after the operation mode has switched to the pointing operation mode and may then be hidden, or the operation mode notification indicating the pointing operation mode may always be displayed while the operation mode is the pointing operation mode.

Here, in the pointing operation mode, there are cases where the selection cursor is displayed as a non-transparent frame image, and where the selection cursor is displayed as a semi-transparent frame image. For example, as shown in FIG. 11, in the pointing operation mode, when the position pointed at by the controller 7 (a pointing position) is placed on none of the option buttons, the selection cursor is displayed as the semi-transparent frame image. Specifically, in the pointing operation mode, when the pointing position of the user is placed outside the display screen of the monitor 2, or is placed within the display screen but not on the images of the displayed option buttons, the semi-transparent selection cursor is displayed in the periphery of the selected button that has been selected by the most recent selection operation, and the enlarged display of the selected button continues. On the other hand, as shown in FIG. 12, in the pointing operation mode, when the pointing position is placed on any one of the option buttons, the option button arranged at the pointing position is set as a selected button. That is, the option button arranged at the pointing position newly becomes a selected button, the non-transparent selection cursor is arranged in the periphery of the selected button, and the selected button is displayed in an enlarged manner, whereby it is indicated to the user that a newly selected button has been selected. On the other hand, from the periphery of the previously selected button that has been selected before the pointing operation, the selection cursor (typically, the semi-transparent selection cursor) is removed, and the enlarged display of the previously selected button is canceled. Thus, the display form of the previously selected button returns to one similar to those of the other option buttons, whereby it is indicated that the previously selected button has been removed from the selection of the user.

As described above, in the selection operation of indicating a selected button from among the plurality of option buttons, it is possible to perform the selection operation of pressing the operation button 72a, and the selection operation of pointing by the controller 7. It is possible to switch these selection operations in accordance with the user's intention, and a switch can be made from one operation mode to the other operation mode by the following operations. For example, when the game apparatus body 5 is operating in the cross key operation mode, the operation mode is switched to the pointing operation mode, if the pointing position moves from out of a predetermined range (e.g., the outside of the display screen of the monitor 2) into the predetermined range (e.g., the inside of the display screen of the monitor 2) in the state where no operation has been performed on the operation buttons 72 of the controller 7 for a predetermined time or longer. On the other hand, when the game apparatus body 5 is operating in the pointing operation mode, the operation mode is switched to the cross key operation mode, if the operation button 72a (cross key) of the controller 7 is pressed. That is, even when the user is not aware of the operation modes described above, the user can switch, by pressing the operation button 72a, to the cross key operation mode where it is possible to perform a selection operation by pressing the operation button 72a. Additionally, if the user once points at the outside of the predetermined range by the controller 7 and subsequently points at the inside of the predetermined range without operating the operation buttons 72, the user can switch to the pointing operation mode where it is possible to perform a selection operation by pointing by the controller 7. Particularly when the user wishes to point at the display screen of the monitor 2 using the controller 7, the controller 7 does not directly point at the display screen, and therefore, it is difficult to determine whether or not the user is accurately pointing at the display screen. Accordingly, the user naturally performs an operation of making various changes in the orientation of the controller 7. This naturally performed operation causes the controller 7 to once point at the outside of the predetermined range, and to subsequently point at the inside of the predetermined range. As a result, the cross key operation mode transfers to the pointing operation mode. That is, the operation mode switches to the pointing operation mode by a natural operation performed when the user intends to point at the display screen of the monitor 2 using the controller 7.

Next, a description is given of details of processing performed in the game system 1. First, with reference to FIG. 13, a description is given of main data used in the processing. It should be noted that FIG. 13 is a diagram showing an example of the main data and programs stored in the external main memory 12 and/or the internal main memory 35 (hereinafter, the two main memories are collectively referred to simply as a "main memory") of the game apparatus body 5.

Figure 13:
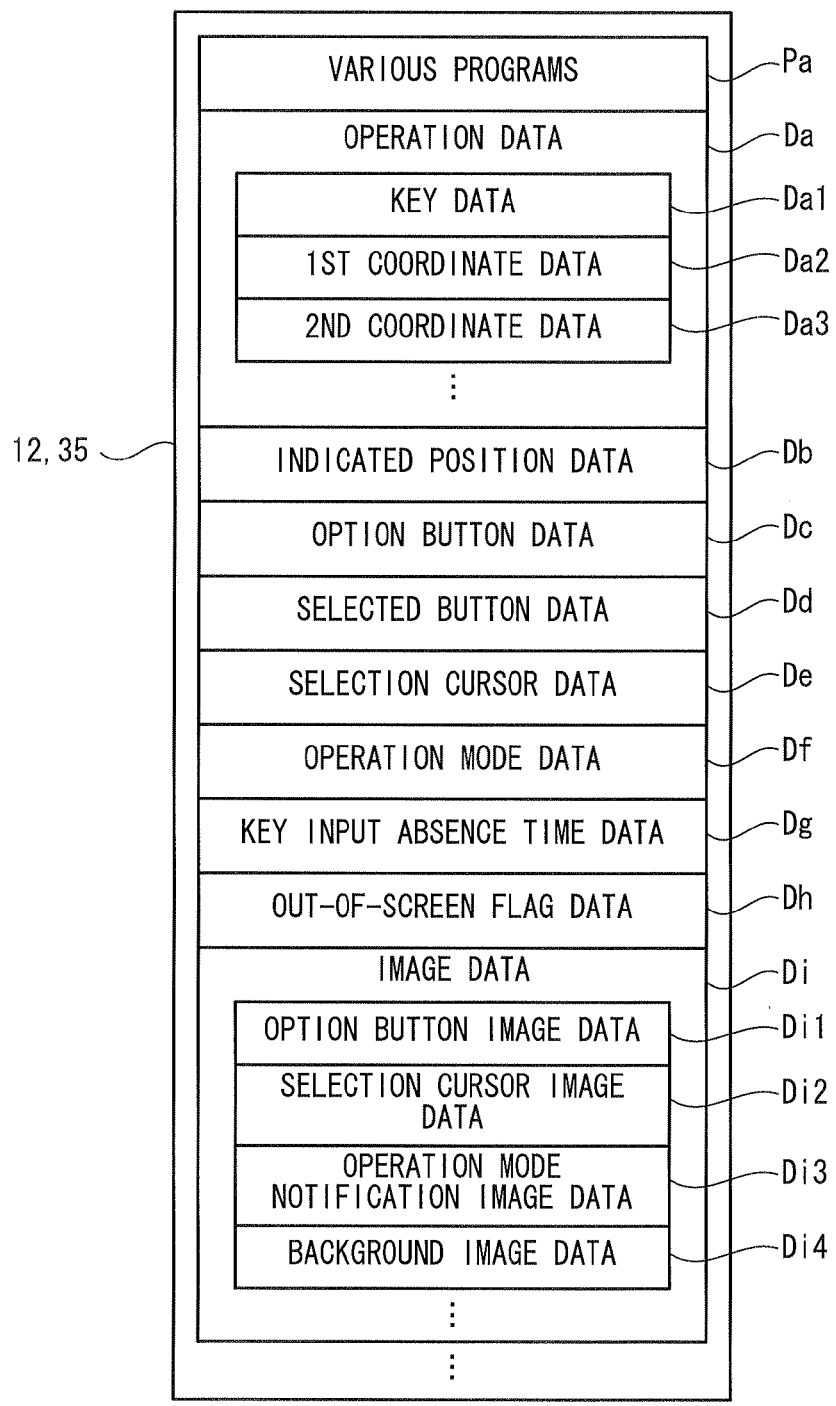
FIG. 13 is a diagram showing an example of main data and programs stored in a main memory of the game apparatus body 5.

As shown in FIG. 13, the following are stored in a data storage area of the main memory: operation data Da; indicated position data Db; option button data Dc; selected button data Dd; selection cursor data De; operation mode data Df; key input absence time data Dg; out-of-screen flag data Dh; image data Di; and the like. It should be noted that the main memory stores, as well as data included in the information shown in FIG. 13, data necessary for the processing, such as data concerning other objects and the like displayed on the monitor 2. Further, in a program storage area of the main memory, a group of various programs Pa are stored that configure the information processing program.

The operation data Da stores a series of pieces of operation information transmitted as transmission data from the controller 7, and is updated to the latest operation data. The operation data Da includes key data Da1, first coordinate data Da2, second coordinate data Da3, and the like. The key data Da1 indicates an operation performed on the operation sections 72 of the controller 7, and stores the latest key data included in the series of pieces of operation information transmitted as the transmission data from the controller 7. The first coordinate data Da2 and the second coordinate data Da3 correspond to the position information of the processing result data described above. The first coordinate data Da2 indicates, in a captured image captured by the image pickup device 743, the position of an image of one of the two markers 8L and 8R (the position in the captured image). The second coordinate data Da3 indicates the position of an image of the other marker (the position in the captured image). For example, the positions of the images of the markers in the captured image are represented by an xy coordinate system in the captured image.

It should be noted that the wireless controller module 19 of the game apparatus body 5 receives the key data and the processing result data included in the operation information transmitted from the controller 7 at predetermined intervals (e.g., every 1/200 seconds), and stores the received data in a buffer (not shown) of the wireless controller module 19. Subsequently, the key data and the processing result data stored in the buffer are read every one-frame period (e.g., every 1/60 seconds), which corresponds to the processing cycle, to thereby update the key data Da1, the first coordinate data Da2, and the second coordinate data Da3, in the main memory.

In this case, the cycle of receiving the operation information and the processing cycle differ from each other, and therefore, the buffer has written therein a plurality of pieces of the operation information received at multiple times. In the descriptions of processes given later, in each step, the process is performed invariably using only the latest piece among a plurality of pieces of the operation information received at multiple times, and the processing proceeds to the subsequent step.

In addition, a process flow will be described later using an example where the key data Da1, the first coordinate data Da2, and the second coordinate data Da3 are updated every one-frame period, which corresponds to the processing cycle. Alternatively, the key data Da1, the first coordinate data Da2, and the second coordinate data Da3 may be updated in another processing cycle. For example, the key data Da1, the first coordinate data Da2, and the second coordinate data Da3 may be updated in each transmission cycle of the controller 7, and the updated key data Da1, first coordinate data Da2, and second coordinate data Da3 may be used in each processing cycle. In this case, the cycles of updating the key data Da1, the first coordinate data Da2, and the second coordinate data Da3 differ from the other processing cycle.

The indicated position data Db indicates a position indicated by the user in a display image (virtual world) displayed on the display screen of the monitor 2, the indicated position set in accordance with a pointing operation of the user pointing by the controller 7 (a pointing position).

The option button data Dc is data concerning a plurality of option buttons and a selected button displayed on the monitor 2 (see FIGS. 10 through 12). For example, the option button data Dc includes data indicating the display position, the display shape, the display size, the display content, the content of the corresponding information processing, and the like of each of the plurality of option buttons (including the selected button). The selected button data Dd is data concerning the selected button selected from among the plurality of option buttons (see FIGS. 10 through 12). For example, the selected button data Dd includes data for distinguishing the button selected as the selected button from among the option buttons. The selection cursor data De is data concerning a selection cursor displayed on the monitor 2 (see FIGS. 10 through 12). For example, the selection cursor data De includes data indicating the display position, the display shape, the display size the display form (non-transparent or semi-transparent), and the like of the selection cursor.

The operation mode data Df indicates an operation mode (e.g., the cross key operation mode or the pointing operation mode) that is currently set. The key input absence time data Dg indicates the time during which no operation is being performed on the operation buttons 72 of the controller 7 (a key input absence time T). The out-of-screen flag data Dh indicates an out-of-screen flag, which is set to ON when the position indicated by the user (the pointing position) has moved out of the display screen of the monitor 2.

The image data Di includes option button image data Di1, selection cursor image data Di2, operation mode notification image data Di3, background image data Di4, and the like. The option button image data Di1 is data for generating a display image by arranging option buttons, a selected button, and the like on the display screen. The selection cursor image data Di2 is data for generating a display image by arranging a selection cursor on the display screen. The operation mode notification image data Di3 is data for generating a display image by arranging an operation mode notification on the display screen (see FIGS. 10 through 12). The background image data Di4 is data for generating an image by arranging a background on the display screen.

Figure 14:
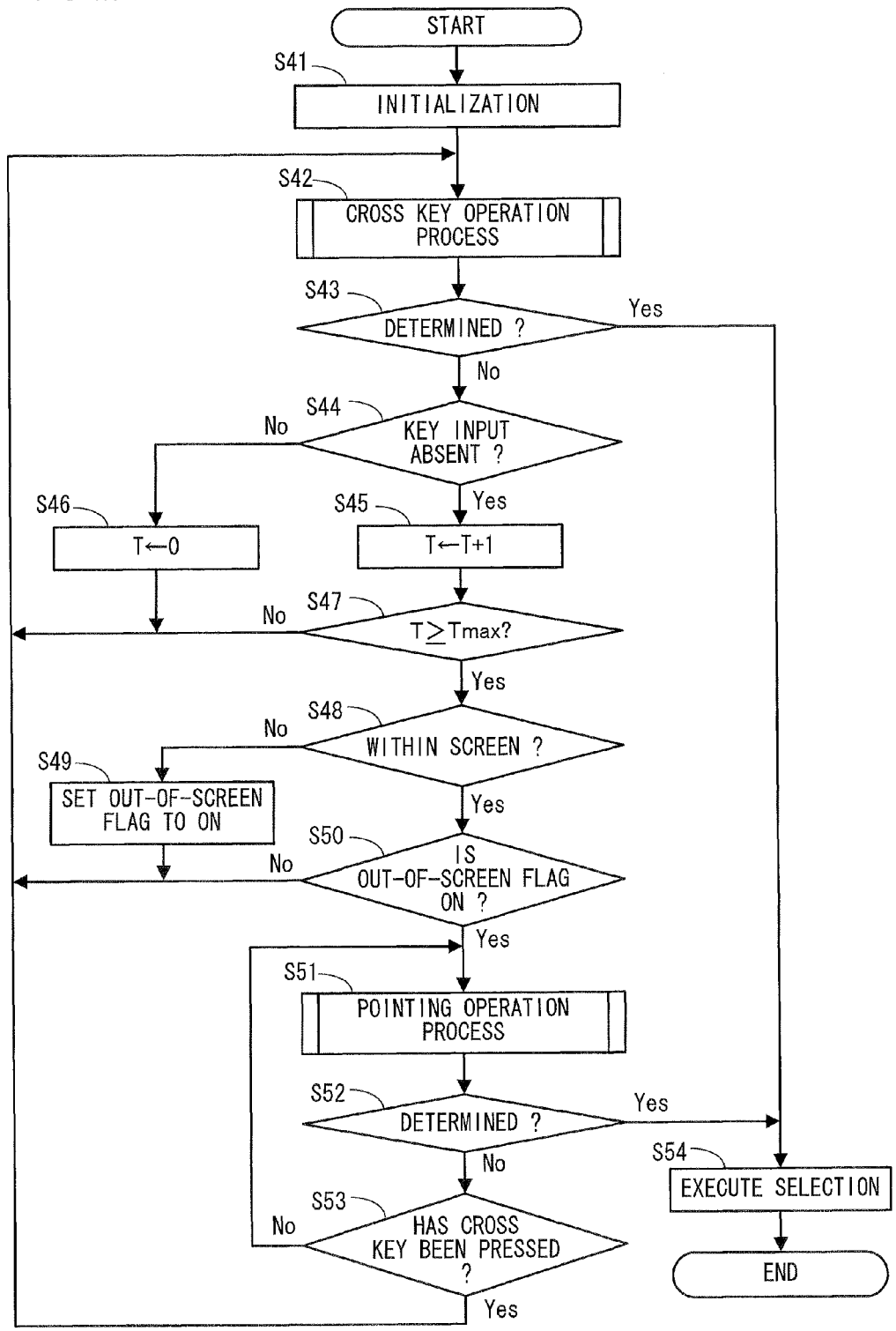
FIG. 14 is a flow chart showing an example of the processing performed by the game apparatus body 5.
Figure 16:
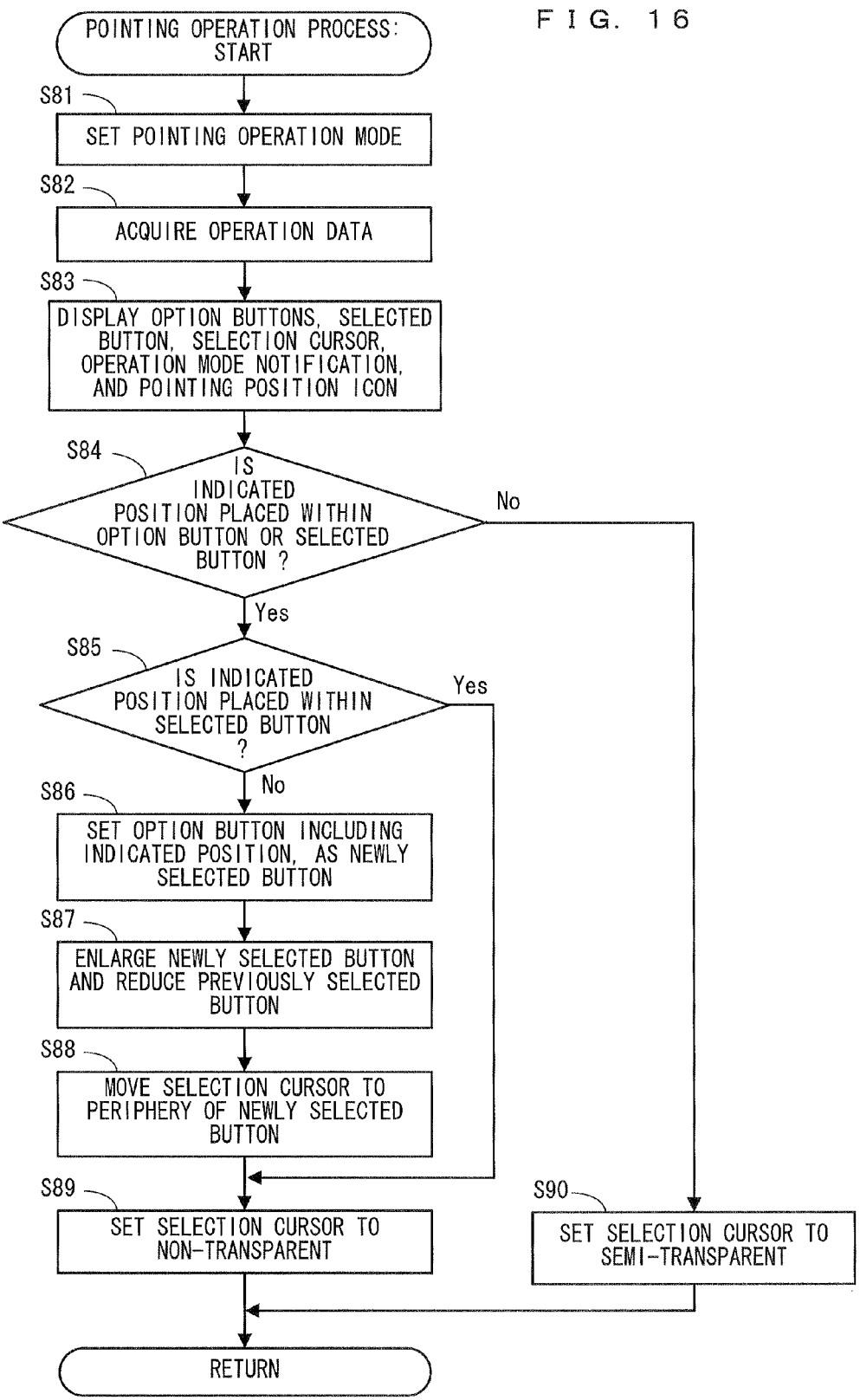
FIG. 16 is a subroutine flow chart showing an example of a pointing operation process in step 51 of FIG. 14.

Next, with reference to FIGS. 14 through 16, a description is given of details of the processing performed by the game apparatus body 5. It should be noted that FIG. 14 is a flow chart showing an example of the processing performed by the game apparatus body 5. FIG. 15 is a subroutine flow chart showing an example of details of a cross key operation process in step 42 of FIG. 14. FIG. 16 is a subroutine flow chart showing an example of a pointing operation process in step 51 of FIG. 14. Here, in the flow charts shown in FIGS. 14 through 16, descriptions are mainly given of, among processes, a process of indicating a selected button from among option buttons and determining the selected button, in accordance with an operation of the user. Thus, the other processes not directly related to the present invention are not described in detail. Further, in FIGS. 14 through 16, each step performed by the CPU 10 is abbreviated as "S".

When the game apparatus body 5 is turned on, the CPU 10 of the game apparatus body 5 executes the boot program stored in the ROM/RTC 13, to thereby initialize each unit such as the main memory. The information processing program stored in the optical disk 4 is loaded into the main memory, and the CPU 10 starts the execution of the program. The flow charts shown in FIGS. 14 through 16 show the processing performed after this process is completed.

Referring to FIG. 14, the CPU 10 performs the initialization of the processing (step 41), and proceeds to the subsequent step. For example, in the initialization in step 41 described above, the CPU 10 initializes a display screen for prompting the user to make a selection, and initializes each parameter. For example, in the initialization, the CPU 10 sets data indicating the display positions, the display shapes, the display sizes, the display contents, the contents of the corresponding information processing, and the like of option buttons to be initially arranged, to thereby update the option button data Dc. Further, in the initialization, the CPU 10 updates the option button data Dc, the selected button data Dd, and the selection cursor data De such that: among the initially arranged option buttons, an option button arranged at a predetermined default position is initialized to a selected button; the initialized selected button is displayed in an enlarged manner; and a selection cursor is set in the periphery of the selected button. Furthermore, in the initialization, the CPU 10 initializes other data to a predetermined value (e.g., 0 or a Null value).

Next, the CPU 10 performs a cross key operation process (step 42), and proceeds to the subsequent step. With reference to FIG. 15, a description is given below of the cross key operation process performed in step 42 described above.

Referring to FIG. 15, the CPU 10 sets the operation mode to the cross key operation mode (step 60), and proceeds to the subsequent step. For example, the CPU 10 sets the operation mode indicated by the operation mode data Df to the cross key operation mode.

Next, the CPU 10 performs a process of arranging and displaying option buttons, a selected button, a selection cursor, an operation mode notification, and the like on the display screen (step 61), and proceeds to the subsequent step. For example, the CPU 10 arranges and displays option buttons, a selected button, a selection cursor, an operation mode notification, and the like on the monitor 2, using the display positions, the display shapes, the display sizes, the display contents, and the like based on the option button data Dc, the selected button data Dd, the selection cursor data De, the operation mode data Df, and the image data Di. Here, in step 61 described above, the CPU 10 does not display the pointing position icon on the display screen. It should be noted that when the pointing position icon is displayed on the display screen in the previous processing, the CPU 10 deletes the pointing position icon from the display screen.

Next, the CPU 10 acquires data indicating operation information from the controller 7 (step 62), and proceeds to the subsequent step. For example, the CPU 10 acquires operation information received from the controller 7, to thereby update the key data Da1, the first coordinate data Da2, and the second coordinate data Da3, using the latest key data and processing result data included in the operation information. Further, the CPU 10 calculates position coordinates in a screen coordinate system as an indicated position (pointing position), using the updated first coordinate data Da2 and second coordinate data Da3, to thereby update the indicated position data Db. It should be noted that when the indicated position cannot be calculated because, for example, the markers 8L and 8R have not been captured in a captured image of the imaging information calculation section 74, the CPU 10 updates the indicated position data Db using data indicating a Null value. A detailed description is given below of an example of calculating the indicated coordinates using the operation information.

For example, the CPU 10 calculates the direction from the position indicated by the first coordinate data Da2 to the position indicated by the second coordinate data Da3. Specifically, with reference to the first coordinate data Da2 and the second coordinate data Da3, the CPU 10 calculates a vector whose starting point is the position indicated by the first coordinate data Da2 and whose end point is the position indicated by the second coordinate data Da3. It is possible to calculate rotation about the axis of the direction perpendicular to an imaging plane of the controller 7, by the difference between the direction represented by the vector and a predetermined reference direction.

In addition, the CPU 10 calculates the position of the midpoint of the position indicated by the first coordinate data Da2 and the position indicated by the second coordinate data Da3. The position of the midpoint represents the positions of the target images (the markers 8L and 8R) in a captured image. This makes it possible to calculate changes in the positions of the target images due to a change in the position of the controller 7, by the difference between the position of the midpoint and a predetermined reference position.

Here, the positional relationships between the markers 8L and 8R, the display screen of the monitor 2, and the controller 7 are considered. For example, the case is considered where the two markers 8L and 8R are placed on the top surface of the monitor 2 (see FIG. 1), and the user points at the center of the display screen of the monitor 2 using the controller 7 whose top surface is directed upward (the state where the center of the display screen is captured at the center of a captured image of the imaging information calculation section 74). In this case, in the captured image of the imaging information calculation section 74, the midpoint of the target images (the midpoint of the position markers 8L and 8R) does not coincide with the position that is pointed at (the center of the display screen). Specifically, the positions of the target images in the captured image are positions above the center of the captured image. A reference position is set so that the center of the display screen is pointed at when the target images are placed at such positions. On the other hand, in accordance with the movement of the controller 7, the positions of the target images in the captured image also move (the moving directions are the opposite directions). Thus, the position on the display screen that is pointed at is moved in accordance with the movements of the positions of the target images in the captured image, whereby it is possible to calculate the position pointed at by the controller 7 based on the display screen (the position coordinates in the screen coordinate system). Here, the reference position may be set by the user pointing at a predetermined position on the display screen in advance, and storing the positions of the target images at this time in association with the predetermined position. Alternatively, the reference position may be set in advance if the positional relationships between the markers 8L and 8R and the display screen are fixed. Yet alternatively, when the markers 8L and 8R are provided separately from the monitor 2 and placed near the monitor 2 (e.g., above or below the monitor 2) for use: the user may be, before starting a game, caused to input at which positions the markers 8L and 8R are placed relative to the monitor (e.g., caused to make a selection from options, such as whether the markers 8L and 8R are placed above or below the monitor 2); reference position data when the markers 8L and 8R are placed above the monitor and reference position data when the markers 8L and 8R are placed below the monitor may be stored in advance in a non-volatile memory included in the optical disk 4 or the game apparatus body 5; and the corresponding reference position data may be selected for use. An indicated position in such a screen coordinate system is calculated by a linear transformation using a function that calculates coordinates based on the display screen of the monitor 2 from the position of the midpoint. This function transforms a value (coordinates) of the position of the midpoint calculated from a captured image, into coordinates representing the position pointed at by the controller 7 on the display screen (the position coordinates in the screen coordinate system) when the captured image is captured. This function makes is possible to calculate an indicated position (pointing position) based on the display screen from the position of the midpoint.

When, however, the user points at the center of the display screen of the monitor 2 using the controller 7 whose top surface is directed in a direction other than an upward direction (e.g., directed rightward), the positions of the target images in the captured image are positions shifted from the center of the captured image in a direction other than the upward direction (e.g., shifted leftward). That is, due to the tilt of the controller 7, the moving direction of the controller 7 does not coincide with the moving direction of the indicated position based on the display screen. In response to this, the position of the midpoint is corrected based on the direction represented by the vector. Specifically, the position of the midpoint is corrected to the position of the midpoint on the assumption that the top surface of the controller 7 is directed upward. More specifically, when the reference position is set, a reference for the direction represented by the vector is also set. Then, the position of the midpoint is corrected by moving the position of the midpoint so as to rotate about the center of the captured image by an amount corresponding to the angular difference between the direction represented by the vector and the reference direction. Subsequently, the indicated position is calculated as described above, using the corrected position of the midpoint.

Next, the CPU 10 determines whether or not a pressing operation has been performed on the cross key (operation button 72a) (step 63). When the pressing operation has been performed on the cross key, the CPU 10 proceeds to the subsequent step 64. On the other hand, when the pressing operation has not been performed on the cross key, the CPU 10 ends the process of this subroutine. For example, with reference to the key data Da1, the CPU 10 determines whether or not the pressing operation has been performed on the cross key (operation button 72a).

In step 64, in accordance with the direction indicated by the pressing operation on the cross key, the CPU 10 switches selected buttons, and proceeds to the subsequent step. For example, with reference to the key data Da1, the option button data Dc, and the selected button data Dd, the CPU 10 sets a selected button corresponding to the direction indicated by the operation. Specifically, when the key data Da1 indicates that the pressing operation has been performed on the right direction of the cross key, the CPU 10 extracts, with reference to the option button data Dc, the option button arranged to the right of the selected button indicated by the selected button data Dd. Then, the CPU 10 sets the extracted option button as a newly selected button, to thereby update the selected button data Dd. That is, in step 64 described above, the selected button that has been indicated by the selected button data Dd is discarded, and the extracted option button is set as a newly selected button.

It should be noted that the method of switching a selected button to a newly selected button in accordance with a pressing operation on the cross key may be any method. As an example, a method may possibly be performed of, every time a pressing operation is performed on the cross key, shifting selected buttons one by one in the direction indicated by the pressing operation. In this case, the change from the state where no pressing operation has been performed on the cross key to the state where a pressing operation has been performed on the cross key triggers the switching of selected buttons in the direction indicated by the pressing operation. As another example, a method may possibly be performed of:

when a pressing operation is performed on the cross key, shifting selected buttons one by one in the direction indicated by the pressing operation; and, when the pressing operation is being continuously performed on the cross key, further shifting selected buttons one by one in the direction indicated by the pressing operation every predetermined time. In this case, the change from the state where no pressing operation has been performed on the cross key to the state where a pressing operation has been performed on the cross key, and the elapse of the predetermined time when the pressing operation is being continuously performed, trigger the switching of selected buttons in the direction indicated by the pressing operation.

Next, the CPU 10 sets the newly selected button set in step 64 described above, so as to be displayed in an enlarged manner, sets the previously selected button that has been set until then, so as to be displayed in a reduced manner in a normal size (step 65), and proceeds to the subsequent step. For example, the CPU 10 enlarges the display size of the option button corresponding to the newly selected button set in step 64 described above, to thereby update the display size of the option button corresponding to the option button data Dc, using the display size after the enlargement. Further, the CPU 10 reduces the display size of the previously selected button that has been set until the newly selected button has been set in step 64 described above, to a size substantially equal to those of the other option buttons, to thereby update the display size of the option button corresponding to the option button data Dc, using the display size after the reduction.

Next, the CPU 10 moves the selection cursor to the periphery of the newly selected button set in step 64 described above (step 66), and ends the process of this subroutine. For example, the CPU 10 sets the position of the selection cursor in the screen coordinate system such that the selection cursor is arranged in the periphery of the newly selected button set in step 64 described above, to thereby update the selection cursor data De using the set position. Further, the CPU 10 sets the display form of the selection cursor to non-transparent, to thereby update the selection cursor data De.

Referring back to FIG. 14, after the cross key operation process in step 42 described above, the CPU 10 determines whether or not a determination operation has been performed (step 43). Here, the determination operation is performed by a predetermined operation button 72 (e.g., the operation button 72*d* (A button)) of the controller 7 being pressed. For example, in step 43 described above, with reference to the key data Da1, the CPU 10 determines whether or not the determination operation has been performed. When the determination operation has not been performed, the CPU 10 proceeds to the subsequent step 44. On the other hand, when the determination operation has been performed, the CPU 10 proceeds to the subsequent step 54.

In step 44, the CPU 10 determines whether or not any of the keys (any of the operation buttons 72) of the controller 7 has been operated. When none of the keys has been operated, the CPU 10 proceeds to the subsequent step 45. On the other hand, when any of the keys has been operated, the CPU 10 proceeds to the subsequent step 46. For example, in step 44 described above, with reference to the key data Da1, the CPU 10 determines whether or not any of the operation buttons 72 has been operated.

In step 45, when none of the keys has been operated, the CPU 10 adds 1 to the key input absence time T, and proceeds to the subsequent step 47. For example, the CPU 10 adds 1 to the key input absence time T indicated by the key input absence time data Dg, to thereby update the key input absence time data Dg using the key input absence time T after the addition.

On the other hand, in step 46, when any of the keys has been operated, the CPU 10 initializes the key input absence time T to 0, returns to step 42 described above, and repeats the same process. For example, the CPU 10 initializes the key input absence time T indicated by the key input absence time data Dg to 0, to thereby update the key input absence time data Dg using the initialized key input absence time T.

In step 47, the CPU 10 determines whether or not the key input absence time T indicated by the key input absence time data Dg is equal to or greater than a threshold Tmax (e.g., 2 seconds). When the key input absence time T is equal to or greater than the threshold Tmax, the CPU 10 proceeds to the subsequent step 48. On the other hand, when the key input absence time T is less than the threshold. Tmax, the CPU 10 returns to step 42 described above, and repeats the same process.

In step 48, the CPU 10 determines whether or not the indicated position indicated by the indicated position data Db is placed within the display screen. When the indicated position is placed within the display screen, the CPU 10 proceeds to the subsequent step 50. On the other hand, when the indicated position is placed outside the display screen or the indicated position is not calculated, the CPU 10 sets the out-of-screen flag to ON, to thereby update the out-of-screen flag data Dh (step 49), returns to step 42 described above, and repeats the same process.

It should be noted that in the process described above, as an example, the out-of-screen flag is switched to ON or OFF only when the key input absence time T is equal to or greater than the threshold Tmax. Alternatively, the ON/OFF state of the out-of-screen flag may be switched at another time. For example, during the cross key operation process (step 42) or a pointing operation process (step 51) described later, a process may always be performed of: when the indicated position is placed within the display screen, setting the out-of-screen flag to OFF; and, when the indicated position is placed outside the display screen, switching the out-of-screen flag to ON.

In step 50, the CPU 10 determines whether or not the out-of-screen flag indicated by the out-of-screen flag data Dh is ON. When the out-of-screen flag is ON, the CPU 10 initializes the key input absence time T indicated by the key input absence time data Dg to 0, sets the out-of-screen flag to OFF to thereby update the out-of-screen flag data Dh, and proceeds to the subsequent step 51. On the other hand, when the out-of-screen flag is OFF, the CPU 10 returns to step 42 described above, and repeats the same process.

In step 51, the CPU 10 performs a pointing operation process, and proceeds to the subsequent step. With reference to FIG. 16, a description is given below of the pointing operation process performed in step 51 described above.

Referring to FIG. 16, the CPU 10 sets the operation mode to the pointing operation mode (step 81), and proceeds to the subsequent step. For example, the CPU 10 sets the operation mode indicated by the operation mode data Df to the pointing operation mode.

Next, the CPU 10 acquires data indicating operation information from the controller 7 (step 82), and proceeds to the subsequent step. For example, the CPU 10 acquires operation information received from the controller 7, to thereby update the key data Da1, the first coordinate data Da2, and the second coordinate data Da3, using the latest key data and processing result data included in the operation information. Further, the CPU 10 calculates position coordinates in the screen coordinate system as an indicated position (pointing position), using the updated first coordinate data Da2 and second coordinate data Da3, to thereby update the indicated position data Db. It should be noted that an example of the method of calculating the indicated position is similar to the process of step 62 described above, and therefore is not described in detail here.

Next, the CPU 10 performs a process of arranging and displaying option buttons, a selected button, a selection cursor, an operation mode notification, a pointing position icon, and the like on the display screen (step 83), and proceeds to the subsequent step. For example, the CPU 10 arranges and displays option buttons, a selected button, a selection cursor, an operation mode notification, a pointing position icon, and the like on the monitor 2, using the display positions, the display shapes, the display sizes, the display contents, and the like based on the indicated position data Db, the option button data Dc, the selected button data Dd, the selection cursor data De, the operation mode data Df, and the image data Di. Here, the CPU 10 arranges the pointing position icon at the position in the screen coordinate system corresponding to the indicated position indicated by the indicated position data Db. When, however, the corresponding position in the screen coordinate system is placed outside the display screen or the indicated position is not calculated, the pointing position icon is consequently not displayed within the display screen.

Next, the CPU 10 determines whether or not the indicated position is placed within any of the option buttons or the selected button (step 84). When the indicated position is placed within any of the option buttons or the selected button, the CPU 10 proceeds to the subsequent step 85. On the other hand, when the indicated position is placed within neither any of the option buttons nor the selected button, or the indicated position is not calculated, the CPU 10 proceeds to the subsequent step 90. For example, the CPU 10 manages the positions, the display sizes, and the display shapes of the option buttons and the selected button, using the option button data Dc. Thus, the CPU 10 determines, using the option button data Dc and the indicated position data Db, whether or not the indicated position is placed within any of the option buttons or the selected button.

In step 85, the CPU 10 determines whether or not the indicated position is placed within the selected button. When the indicated position is not placed with the selected button (i.e., is placed within the option buttons), the CPU 10 proceeds to the subsequent step 86. On the other hand, when the indicated position is placed within the selected button, the CPU 10 proceeds to the subsequent step 89. For example, the CPU 10 determines, using the option button data Dc and the selected button data Dd, whether or not the indicated position is placed within the selected button.

In step 86, the CPU 10 sets the option button including the indicated position, as a newly selected button, and proceeds to the subsequent step. For example, with reference to the indicated position data Db and the option button data Dc, the CPU 10 extracts the option button including the indicated position. Then, the CPU 10 sets the extracted option button as a newly selected button, to thereby update the selected button data Dd. That is, in step 86 described above, the selected button that has been indicated by the selected button data Dd is discarded, and the extracted option button is set as a newly selected button.

Next, the CPU 10 sets the newly selected button set in step 86 described above, so as to be displayed in an enlarged manner, sets the previously selected button that has been set until then, so as to be displayed in a reduced manner in a normal size (step 87), and proceeds to the subsequent step. For example, the CPU 10 enlarges the display size of the option button corresponding to the newly selected button set in step 86 described above, to thereby update the display size of the option button corresponding to the option button data Dc, using the display size after the enlargement. Further, the CPU 10 reduces the display size of the previously selected button that has been set until the newly selected button has been set in step 64 described above, to a size substantially equal to those of the other option buttons, to thereby update the display size of the option button corresponding to the option button data Dc, using the display size after the reduction.

Next, the CPU 10 moves the selection cursor to the periphery of the newly selected button set in step 86 described above (step 88), and proceeds to the subsequent step 89. For example, the CPU 10 sets the position of the selection cursor in the screen coordinate system such that the selection cursor is arranged in the periphery of the newly selected button set in step 86 described above, to thereby update the selection cursor data De using the set position.

In step 89, the CPU 10 sets the display form of the selection cursor to non-transparent to thereby update the selection cursor data De, and ends the process of this subroutine.

On the other hand, in step 90, the CPU 10 sets the display form of the selection cursor to semi-transparent to thereby update the selection cursor data De, and ends the process of this subroutine.

Referring back to FIG. 14, after the pointing operation process in step 51 described above, the CPU 10 determines whether or not a determination operation has been performed (step 52). Here, the determination operation is performed by a predetermined operation button 72 (e.g., the operation button 72*d* (A button)) of the controller 7 being pressed. For example, in step 52 described above, with reference to the key data Da1, the CPU 10 determines whether or not the determination operation has been performed. When the determination operation has not been performed, the CPU 10 proceeds to the subsequent step 53. On the other hand, when the determination operation has been performed, the CPU 10 proceeds to the subsequent step 54.

In step 53, the CPU 10 determines whether or not the operation button 72*a* (cross key) has been operated. When the operation button 72*a* has not been operated, the CPU 10 returns to step 51 described above, and repeats the same process. On the other hand, when the operation button 72*a* has been operated, the CPU 10 returns to step 42 described above, and repeats the same process. For example, in step 53 described above, with reference to the key data Da1, the CPU 10 determines whether or not the operation button 72*a* has been operated.

In step 54, the CPU 10 performs processing corresponding to the option selected by the user, and ends the process of the flow chart. Here, the process of step 54 described above is performed when a positive determination has been made in the determination process of step 43 or step 52 described above, that is, when the user has performed the determination operation. In this case, one of the option buttons has been selected as the selected button in the cross key operation process in step 42 described above, or in the pointing operation process in step 51 described above. Thus, in step 54 described above, with reference to the option button data Dc, the CPU 10 acquires the content of information processing corresponding to the selected button that has been selected when the determination operation has been performed, and starts to perform the information processing.

As described above, based on the above process, when predetermined information processing is performed by selecting either the operation of pressing the operation buttons 72 or the operation of pointing by the controller 7, it is possible to switch the operation methods in accordance with the user's intention.

It should be noted that in the above descriptions, as an example, the following are prepared: the selection operation mode where the user performs a pressing operation on the operation button 72a (cross key) of the controller 7 (the cross key operation mode); and the selection operation mode where the user points at the display screen of the monitor 2 using the controller 7 (the pointing operation mode). Alternatively, the present invention can be achieved also by a combination of other selection operations. For example, the following may be prepared: a selection operation mode where the user performs a pressing operation on another operation button 72 provided on the controller 7; and the pointing operation mode. Then, these operation modes may be switched to each other in a similar manner. Yet alternatively, as described above, when four push switches arranged in a cross formation, an operation section having a composite switch including four push switches and a center switch, a joystick, an operation section in which a disk-shaped member is slid, a touch pad, or the like are provided on the controller 7, the following may be prepared: a selection operation mode where the user operates such device; and the pointing operation mode. Then, these operation modes may be switched to each other in a similar manner.

Figure 17A:
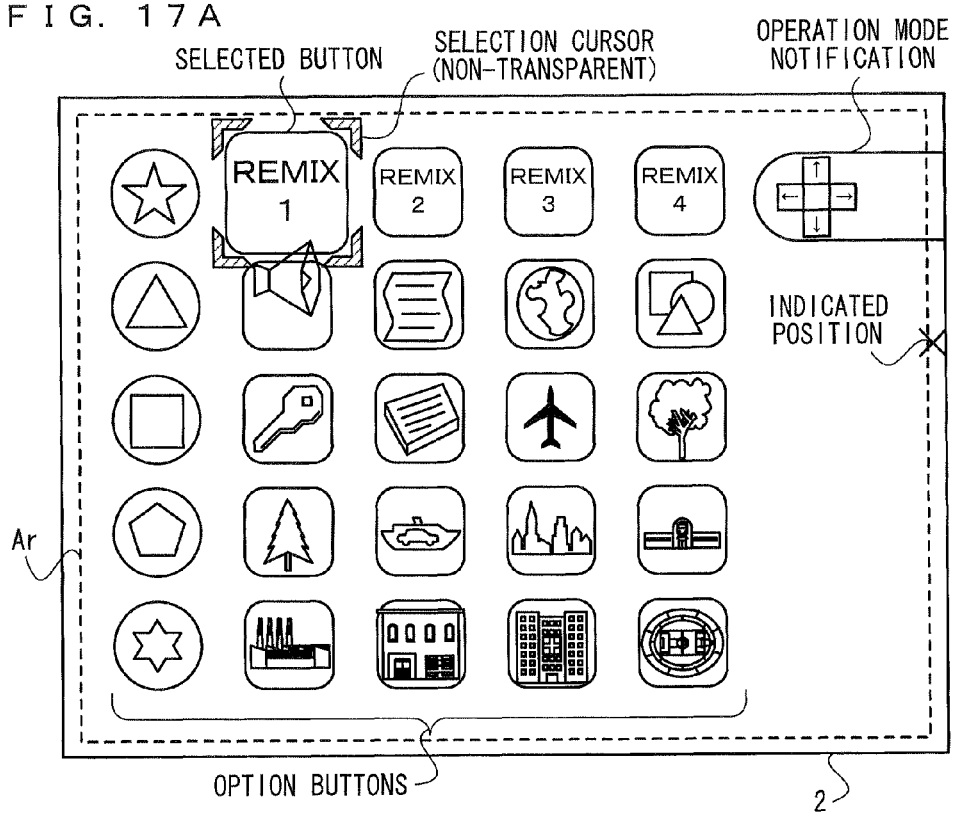
FIG. 17A is a schematic diagram outlining an example of an image displayed on the monitor 2 in a direction key operation mode.
Figure 17B:
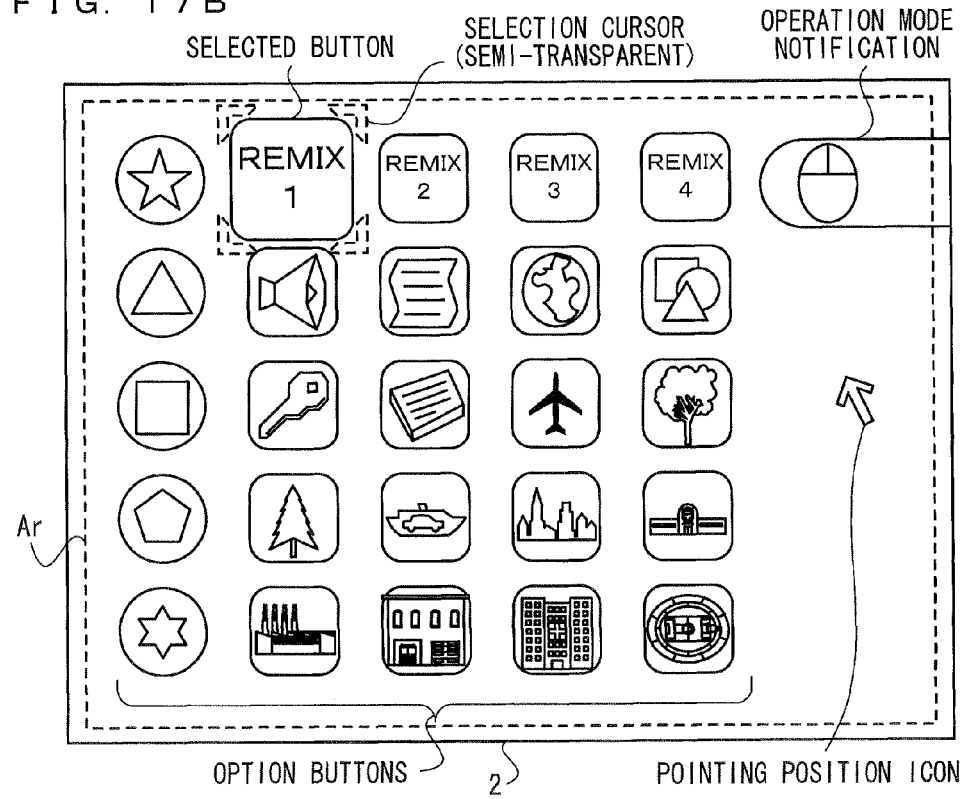
FIG. 17B is a schematic diagram outlining an example of an image displayed on the monitor 2 in a mouse operation mode.

Further, the following may be prepared: a selection operation mode where the user performs a pressing operation on a key (e.g., a direction key) of a keyboard (a direction key operation mode); and a selection operation mode where a position on the display screen is specified using a mouse (a mouse operation mode). Then, these operations may be switched to each other. With reference to FIGS. 17A and 17B, a description is given below of an example where the direction key operation mode and the mouse operation mode are switched to each other. It should be noted that FIG. 17A is a schematic diagram outlining an example of an image displayed on the monitor 2 in the direction key operation mode. FIG. 17B is a schematic diagram outlining an example of an image displayed on the monitor 2 in the mouse operation mode.

In FIG. 17A, similarly to the example described above, a plurality of option buttons for prompting the user to perform a selection operation and a selected button are displayed on the monitor 2. When the game apparatus body 5 is operating in the direction key operation mode, an operation mode notification having, for example, a mark representing direction keys, is displayed on the monitor 2 in order to notify the user that the operation mode is the direction key operation mode. Then, the selected button that is selected at this time is provided with a non-transparent selection cursor in its periphery, and is displayed in an enlarged manner relative to the other option buttons.

When the user wishes to switch to the mouse operation mode in the state where the game apparatus body 5 is operating in the direction key operation mode as described above, the operation mode is switched to the mouse operation mode, if a position indicated by the mouse (a pointing position) moves from out of a predetermined range into the predetermined range in the state where no key input has been provided to the keyboard for a predetermined time or longer. Here, generally, when a position on the display screen is specified using the mouse, it is often not possible to specify the outside of the display screen. Accordingly, the specifiable range is limited within the display screen. Therefore, when the mouse is used for a selection operation, it is not possible to set the entire display screen of the monitor 2 to the predetermined range used for the determination of switching. Thus, the determination of switching is made by setting the predetermined range, used to switch to the mouse operation mode, within a display area that can be displayed on the monitor 2. For example, as shown in FIG. 17A, a determination area Ar is set so as to exclude an outer edge area of the display area of the monitor 2. Then, the operation mode is switched to the mouse operation mode, if the position indicated by the mouse moves from out of the determination area Ar into the determination area Ar in the state where no key input has been provided to the keyboard for a predetermined time or longer. As described above, the predetermined range used to switch the selection operations may be set to a range equal to the entire display screen, may be set to a range greater than the entire display screen, or may be set in a part within the display screen. It should be noted that FIG. 17A shows the indicated position in the direction key operation mode; however, this is to make understandable the example where the indicated position is set outside the determination area Ar. Alternatively, an image representing the indicated position may not need to be displayed on the monitor 2.

When the game apparatus body 5 has started to operate in the mouse operation mode after the switching operation described above, an operation mode notification having, for example, a mark representing a mouse, is displayed on the monitor 2 in order to notify the user that the operation mode is the mouse operation mode (see FIG. 17B). Then, similarly to the direction key operation mode, the selected button that is selected at this time is provided with a selection cursor in its periphery, and is displayed in an enlarged manner relative to the other option buttons. Further, in the mouse operation mode, a pointing position icon is displayed on the monitor 2 as a mark indicating the position indicated by the mouse.

Here, also in the mouse operation mode, there are cases where the selection cursor is displayed as a non-transparent frame image, and where the selection cursor is displayed as a semi-transparent frame image. For example, as shown in FIG. 17B, in the mouse operation mode, when the position indicated by the mouse is placed on none of the option buttons, the selection cursor is displayed as the semi-transparent frame image. Specifically, in the mouse operation mode, when the position indicated by the user is not placed on the images of the displayed option buttons, the semi-transparent selection cursor is displayed in the periphery of the selected button that has been selected by the most recent selection operation, and the enlarged display of the selected button continues. On the other hand, in the mouse operation mode, when the position indicated by the mouse is placed on any one of the option buttons, the option button arranged at the indicated position is set as a selected button. That is, the option button arranged so as to overlap the position indicated by the mouse newly becomes a selected button, the non-transparent selection cursor is arranged in the periphery of the selected button, and the selected button is displayed in an enlarged manner, whereby it is indicated to the user that a newly selected button has been selected.

In the above descriptions, the following are used: the form where a switch is made between the selection operation mode where the the user performs a pressing operation on the operation button 72a (cross key) (the cross key operation mode), and the selection operation mode where the user points at the display screen of the monitor 2 using the controller 7 (the pointing operation mode); and the form where a switch is made between the selection operation mode where the user performs a pressing operation on a direction key of the keyboard (the direction key operation mode), and the selection operation mode where a position on the display screen is specified using the mouse (the mouse operation mode). In each form, a switch is made between: a selection operation mode where a pressing operation is performed on a button (the cross key operation mode and the direction key operation mode); and a selection operation mode where a pointing device is used (the pointing operation mode and the mouse operation mode). Alternatively, a switch may be made between selection operations using other devices. For example, a switch may be made between: a selection operation mode where a touch operation is performed on a touch panel (a touch operation mode); and the pointing operation mode. In this form, a switch is made between: a selection operation mode where a pointing device is used (the touch operation mode); and a selection operation mode where another pointing device different from the the pointing device is used (the pointing operation mode and the mouse operation mode). It should be noted that the touch panel used in this description may be another device. For example, this form can be achieved also using a trackpad, a trackball, a graphics tablet, a joystick, or the like, instead of the touch panel.

In this case, the touch operation mode is switched to the pointing operation mode or the mouse operation mode, if the position pointed at by the controller 7 or the position indicated by the mouse moves from out of a predetermined range into the predetermined range in the state where no touch operation has been performed on the touch panel for a predetermined time or longer. On the other hand, the pointing operation mode or the mouse operation mode is switched to the touch operation mode, if a touch operation is performed on the touch panel. As described above, even when the user is not aware of the touch operation mode, the pointing operation mode, the mouse operation mode, and the like described above, the user can switch, by performing a touch operation on the touch panel, to the touch operation mode where it is possible to perform a selection operation by performing a touch operation on the touch panel. Further, if the user once indicates the outside of a predetermined range by the controller 7 or the mouse and subsequently indicates the inside of the predetermined range without performing a touch operation on the touch panel, the user can switch to the pointing operation mode or the mouse operation mode where it is possible to perform a selection operation by giving an indication by the controller 7 or the mouse.

Such switching of operations is suitable when a switch is made between: an operation where a touch panel covered by a display screen is used; and an operation where the display screen is pointed at by a controller. That is, the user can perform an operation of: when the display screen is placed within the reach of the user, directly touching the display screen using the touch panel covered by the display screen; and, when the display screen is placed out of the reach of the user, performing a remote operation of pointing at the display screen by the controller. Then, the switching of these operations is quickly made without the user's awareness, and therefore, it is possible to switch the two operations in accordance with the user's intention in a stress-free manner.

In addition, in the example of the information processing described with reference to FIGS. 14 through 16, the cross key operation mode is set first at the start of the processing. Alternatively, the pointing operation mode may be set first. In this case, the processes of steps 51 through 53 described above may be performed immediately after the initialization in step 41 described above. Then, when a positive determination has been made in step 53, the processes of steps 41 through 50 described above may be performed. Further, the operation mode selected last by the user in the information processing may be set as the one to which the operation mode is to be initialized when the information processing is performed next.

In addition, in the above descriptions, in a switch from the cross key operation mode to the pointing operation mode, in a switch from the direction key operation mode to the mouse operation mode, and in a switch from the touch operation mode to the pointing operation mode or the mouse operation mode, one of switching conditions is that no operation has been performed on the cross key, the direction key, or the touch panel for a predetermined time or longer. This is to prevent the operation mode from being switched to the other operation mode without the user's intention. For example, in the cross key operation mode, while operating the operation button 72a of the controller 7, the user may possibly move the controller 7 per se during the operation. In this case, the above switching condition prevents the operations from being switched without the user's intention. Without such switching condition, however, a switch may be made to the pointing operation mode during the operation of the operation button 72a. It should be noted that when such an effect is not desired, it is not necessary to take the switching condition into account. As an example, in a switch from the cross key operation mode to the pointing operation mode, in a switch from the direction key operation mode to the mouse operation mode, and in a switch from the touch operation mode to the pointing operation mode or the mouse operation mode, a switch is made to the pointing operation mode or the mouse operation mode, if the cross key, the direction key, or the touch panel is not being operated when the indicated position indicated by the controller 7 or the mouse has moved from out of a predetermined range into the predetermined range. As another example, in a switch from the cross key operation mode to the pointing operation mode, in a switch from the direction key operation mode to the mouse operation mode, and in a switch from the touch operation mode to the pointing operation mode or the mouse operation mode, a switch is made to the pointing operation mode or the mouse operation mode, if an operation is only performed of once indicating the outside of a predetermined range by the controller 7 or the mouse and subsequently indicating the inside of the predetermined range.

In addition, in the above descriptions, two switchable operations are applied to an operation of making a selection from among options displayed on the display screen. Alternatively, the operations described above may be applied to another operation. For example, in an operation of moving a player character arranged in a virtual world, a switch may be made by the processing described above, between: an operation of moving the player character in accordance with a pressed direction of the cross key; and an operation of moving the player character such that the object of the movement is the position or the direction pointed at by the controller 7, the position or the direction specified by the mouse, or the like. It should be noted that in this example of the switching of operations, the switching of operations may possibly further trigger the switching of viewpoints in a game image. For example, in the operation mode where the player character is moved in accordance with a pressed direction of the cross key, a game image from an objective viewpoint of the virtual world including the player character is displayed. On the other hand, in the operation mode where the player character is moved such that the object of the movement is the position or the direction pointed at by the controller 7, the position or the direction specified by the mouse, or the like, a game image from a first-person viewpoint, where the player character views the virtual world, is displayed. As described above, the association of the switching of operations with the switching of viewpoints also makes it possible to achieve a more interesting game.

In addition, in the above descriptions, as a form, to remotely specify coordinates on the display screen, the coordinates are specified on the display screen of the monitor 2 by analyzing image data of an image obtained by capturing imaging targets using the image pickup device 743 provided in the controller 7. This form is where: two markers are placed in the vicinity of the display screen so as to serve as imaging targets; a device, including imaging means and a housing that allows the imaging direction of the imaging means to be changed without restriction, detects the two markers in a captured image; and a coordinate position specified by the device is derived based on the positions of the markers in the captured image. The coordinates, however, may be specified in another form.

For example, the imaging targets placed in the vicinity of the display screen may be, as well as the electrical markers (LED modules) described above, physical markers having a light-reflecting member, a specific color, and a specific shape. Alternatively, imaging targets may be displayed on the display screen of the monitor 2. Yet alternatively, the monitor per se may be used as an imaging target by the imaging means of the controller 7 reading the scan lines of a Raster scan monitor. Yet alternatively, a magnetic generation device may be provided, and coordinates may be remotely specified using magnetism generated by the magnetic generation device. In this case, a magnetic sensor is provided in the controller 7 so as to detect the magnetism.

In addition, in the above descriptions, the infrared lights from the two markers 8L and 8R are used as the imaging targets for the imaging information calculation section 74 of the controller 7. Alternatively, other objects may be used as imaging targets. For example, one marker, or three or more markers, may be placed in the vicinity of the monitor 2, and the infrared lights from these markers may be used as imaging targets for the imaging information calculation section 74. For example, the present invention can be similarly achieved also when one marker having a predetermined length is placed in the vicinity of the monitor 2. Yet alternatively, the display screen per se of the monitor 2, or another luminous body (e.g., an interior light) may be used as an imaging target for the imaging information calculation section 74. Various luminous bodies can be used as an imaging target for the imaging information calculation section 74 by calculating the position of the controller 7 relative to the display screen based on the positional relationship between the imaging target and the display screen of the monitor 2.

Yet alternatively, imaging targets such as markers may be provided in the controller 7, and imaging means may be provided in the monitor 2. In yet another example, a mechanism for emitting light from the front surface of the controller 7 may be provided. In this case, an imaging device for capturing the display screen of the monitor 2 is placed other than in the controller 7 or the monitor 2, and the position on which the light emitted from the controller 7 to the display screen of the monitor 2 is reflected is analyzed from an image captured by the imaging device, whereby it is possible to configure a pointing device capable of outputting data for remotely specifying coordinates on the display screen in a similar manner.

In addition, in the above embodiments, the descriptions are given using the stationary game apparatus 3. Alternatively, the present invention may be achieved by causing an information processing apparatus, such as a hand-held game apparatus and a general personal computer, to execute the information processing program according to the present invention. In addition, in another embodiment, not only a game apparatus but also any hand-held electronic device may be used, such as a personal digital assistant (PDA), a mobile phone, a personal computer, and a camera.

In addition, in the above descriptions, the information processing is performed by the game apparatus body 5. However, at least some of the process steps in the information processing may be performed by another device. For example, when the game apparatus body 5 is configured to communicate with another device (e.g., a server or another game apparatus), the process steps in the information processing may be performed by the cooperation of the game apparatus body 5 and said another device. As an example, said another device may perform the process of setting option buttons and the like, and the game apparatus body 5 may acquire data concerning the option buttons and perform the processes of steps 41 through 54 using the acquired data. When an operation of determining any of the options has been performed, the game apparatus body 5 may transmit data indicating the determination to said another device, and may acquire data used for the processing corresponding to the determination from said another device. Thus, at least some of the process steps in the information processing may be performed by another device, whereby it is possible to perform processing similar to the information processing described above. The information processing described above can be performed by a processor or by the cooperation of a plurality of processors, the processor and the plurality of processors included in an information processing system that includes at least one information processing apparatus. Further, in the above embodiment, the process of the flow chart described above is performed by the CPU 10 of the game apparatus body 5 executing a predetermined program. Alternatively, some or all of the process may be performed by a dedicated circuit provided in the game apparatus body 5.

In addition, in the above descriptions, the controller 7 and the game apparatus body 5 are connected to each other by wireless communication. Alternatively, the controller 7 and the game apparatus body 5 may be electrically connected to each other via a cable. In this case, a cable connected to the controller 7 is connected to a connection terminal of the game apparatus body 5.

In addition, the shape of the controller 7, and the shapes, the number, the arrangement, and the like of the various operation buttons arranged thereon are merely illustrative, and the present invention can be achieved also with other shapes, numbers, arrangements, and the like. Further, the processing orders, the setting values, the display forms, the criterion values, and the like that are used in the information processing described above are also merely illustrative, and it is needless to say that the present invention can be achieved also with other orders, display forms, and values. For example, in the above descriptions, as an example, a non-transparent selection cursor and a semi-transparent selection cursor are provided so as to surround a selected button. Alternatively, a selection cursor in another display form, or of another shape, may be provided. As an example, a selection cursor, the inside of whose frame image is transparent such that its semi-transparent portion is not filled, may be provided to a selection icon, instead of the semi-transparent selection cursor described above. As another example, a non-transparent selection cursor, which is different in color from the non-transparent selection cursor described above, may be provided to a selection icon, instead of the semi-transparent selection cursor described above.

It should be noted that the information processing program described above may be supplied to the game apparatus body 5 not only from an external storage medium such as the optical disk 4, but also via a wireless or wired communication link. Further, the information processing program may be stored in advance in a non-volatile storage device of the game apparatus body 5. It should be noted that examples of the information storage medium having stored thereon the information processing program may include a CD-ROM, a DVD, any other optical disk storage medium similar to these, a flexible disk, a hard disk, a magnetic optical disk, a magnetic tape, a non-volatile memory, and the like. Furthermore, the information storage medium for storing therein the information processing program may be a non-volatile memory or a volatile memory.

While the invention has been described in detail, the foregoing description is in all aspects illustrative and not restrictive. It is understood that numerous other modifications and variations can be devised without departing from the scope of the invention. It is understood that the scope of the invention should be interpreted only by the appended claims. It is also understood that one skilled in the art can implement the invention in the equivalent range based on the description of the invention and common technical knowledge, from the description of the specific embodiments of the invention. Further, throughout the specification, it should be understood that terms in singular form include the concept of plurality unless otherwise specified. Thus, it should be understood that articles or adjectives indicating the singular form (e.g., "a", "an", "the", and the like in English) include the concept of plurality unless otherwise specified. Furthermore, it should be understood that terms used in the present specification have meanings generally used in the art unless otherwise specified. Therefore, unless otherwise defined, all the jargons and technical terms have the same meanings as those generally understood by one skilled in the art of the invention. In the event of any contradiction, the present specification (including meanings defined herein) has priority.

A storage medium having stored thereon an information processing program, an information processing apparatus, an information processing system, and an information processing method, according to the present invention, are capable of, when input operations are performed using a plurality of types of input means, switching the input operations in accordance with a user's intention, and therefore are suitable for use as: an information processing apparatus and an information processing system that are capable of performing operations using a plurality of types of input means; an information processing program executed by the information processing apparatus and the information processing system; an information processing method performed by a processor or by the cooperation of a plurality of processors, the processor and the plurality of processors included in the information processing apparatus or the information processing system; and the like.

What is claimed is:

1. A non-transitory computer-readable storage medium having stored thereon an information processing program to be executed by a computer of an information processing apparatus that can use operation signals output respectively from a pointing device and an input device different from the pointing device and performs predetermined information processing in accordance with the operation signals, the information processing program causing the computer to perform:

acquiring a first operation signal output from the pointing device;

acquiring a second operation signal output from the input device;

performing the information processing using the second operation signal output from the input device;

while in a state where the second operation signal is used for the information processing, calculating, based on the first operation signal output from the pointing device, a position indicated on a predetermined plane corresponding to displayed content;

while in the state where the second operation signal is used for the information processing, determining whether or not the indicated position has moved from a position on the predetermined plane that is outside of a predetermined area on the predetermined plane and to a position on the predetermined plane that is in the predetermined area on the predetermined plane;

when a result of the determination is positive in the state where the second operation signal is used for the information processing, switching the operation signals used for the information processing from the second operation signal output from the input device to the first operation signal output from the pointing device; and performing the information processing based on the indicated position, when the operation signals used for the information processing is switched from the second operation signal to the first operation signal.

2. The non-transitory computer-readable storage medium having stored thereon the information processing program according to claim 1, the information processing program further causing the computer to perform:

determining, based on the second operation signal, whether or not an input operation has been performed on the input device, wherein the operation signals used for the information processing is switched from the second operation signal to the first operation signal, when a result of the determination of whether or not the input operation has been performed on the input device is negative and the result of the determination of whether or not the indicated position has moved from out of the predetermined area on the plane into the predetermined area is positive in the state where the second operation signal is used for the information processing.

3. The non-transitory computer-readable storage medium having stored thereon the information processing program according to claim 2, wherein the operation signals used for the information processing is switched from the second operation signal to the first operation signal, when the result of the determination of whether or not the input operation has been performed on the input device is continuously negative for a predetermined time or longer and the result of the determination of whether or not the indicated position has moved from out of the predetermined area on the plane into the predetermined area is positive in the state where the second operation signal is used for the information processing.

4. The non-transitory computer-readable storage medium having stored thereon the information processing program according to claim 2, the information processing program further causing the computer to perform:

acquiring a third operation signal output from another input device different from the pointing device and the input device, performing, based on the third operation signal, information processing related to the information processing, and determining whether or not input operations have been performed on both the input device and said another input device.

5. The non-transitory computer-readable storage medium having stored thereon the information processing program according to claim 1, the information processing program further causing the computer to perform:

determining, based on the second operation signal, whether or not an input operation has been performed on the input device, wherein the operation signals used for the information processing is switched from the first operation signal to the second operation signal, when a result of the determination of whether or not the input operation has been performed on the input device is positive in a state where the first operation signal is used for the information processing.

6. The non-transitory computer-readable storage medium having stored thereon the information processing program according to claim 1, the information processing program further causing the computer to perform:

displaying on a display device an image representing a result of the performed information processing, wherein setting an area corresponding to an entire display screen of the display device as the predetermined area on the plane, and determining whether or not the indicated position has moved from out of the area corresponding to the entire display screen into the area corresponding to the entire display screen.

7. The non-transitory computer-readable storage medium having stored thereon the information processing program according to claim 1, wherein the pointing device, which outputs the first operation signal: includes an imaging section that is fixed to an input apparatus body so as to capture a periphery of the input apparatus body in a predetermined direction, or that is provided outside the input apparatus body so as to capture the input apparatus body; and is configured to output, as the first operation signal, data indicating a captured image captured by the imaging section, or indicating a result of performing a predetermined calculation on the captured image, the indicated position is calculated based on a position of an imaging target captured in the captured image, and the input device: includes a direction indication section that is operated by a direction input operation of a user; and is configured to output, as the second operation signal, data indicating a direction corresponding to the direction input operation performed on the direction indication section.

8. The non-transitory computer-readable storage medium having stored thereon the information processing program according to claim 7, the information processing program further causing the computer to perform:

displaying on a display device an image representing a result of the performed information processing, wherein the imaging target is provided in a vicinity of the display device, the imaging section is fixed to the input apparatus body, and captures the imaging target when the display device is present in the periphery of the input apparatus body in the predetermined direction, and the direction indication section is provided in the input apparatus body such that a direction input operation for an upward direction corresponds to the predetermined direction in a display image displayed on the display device.

9. The non-transitory computer-readable storage medium having stored thereon the information processing program according to claim 1, the information processing program further causing the computer to perform:

displaying on a display device an image representing a result of the performed information processing, setting a pointer indicating the indicated position when the operation signals used for the information processing is switched from the second operation signal to the first operation signal, and displaying on the display device the image representing the result of the information processing such that the pointer is provided at the indicated position in the image.

10. The non-transitory computer-readable storage medium having stored thereon the information processing program according to claim 1, the information processing program further causing the computer to perform:

displaying on a display device an image representing a result of the performed information processing, and performing, as the information processing, a process of selecting, from among a plurality of options displayed on the display device, an option corresponding to the indicated position or the second operation signal.

11. The non-transitory computer-readable storage medium having stored thereon the information processing program according to claim 10, wherein the selecting is performed, from among the plurality of options displayed on the display device, an option overlapping the indicated position, when the first operation signal is used in the information processing; and an option is selected by shifting a selected option, which is selected from among the plurality of options, in a direction corresponding to a direction input operation indicated by the second operation signal, when the second operation signal is used for the information processing.

12. A non-transitory computer-readable storage medium having stored thereon an information processing program to be executed by a computer of an information processing apparatus that can use operation signals output respectively from a pointing device and an input device different from the pointing device and performs predetermined information processing in accordance with the operation signals, the information processing program, when executed, causing the computer to perform:

acquiring a first operation signal output from the pointing device;

acquiring a second operation signal output from the input device;

while in a state where the second operation signal is used for the information processing, calculating, based on the first operation signal output from the pointing device, a position indicated on a predetermined plane;

while in the state where the second operation signal is used for the information processing, determining whether or not the indicated position has moved from out of a predetermined area on the plane and into the predetermined area;

when a result of the determination is positive in the state where the second operation signal is used for the information processing, switching the operation signals used for the information processing from the second operation signal to the first operation signal;

performing the information processing based on the indicated position, when the operation signals used for the information processing is switched from the second operation signal to the first operation signal;

displaying on a display device an image representing a result of the performed information processing; and performing, as the information processing, a process of selecting, from among a plurality of options displayed on the display device, an option corresponding to the indicated position or the second operation signal, wherein a setting is made such that a first form mark is provided to an option selected from among the plurality of options when the second operation signal is used for the information processing, when the indicated position overlaps any of the plurality of options displayed on the display device when the first operation signal is used for the information processing, making a setting such that the first form mark is provided to the overlapping option; and, when the indicated position overlaps none of the plurality of options displayed on the display device, making a setting such that a mark provided to an option that has been selected until most recently is changed to a second form mark different from the first form mark, and displaying on the display device the image representing the result of the information processing such that the set mark is provided to the option in the image.

13. An information processing apparatus that can use operation signals output respectively from a pointing device and an input device different from the pointing device and performs predetermined information processing in accordance with the operation signals, the information processing apparatus comprising:

a first operation signal acquisition device configured to acquire a first operation signal output from the pointing device;

a second operation signal acquisition device configured to acquire a second operation signal output from the input device; and at least one processor configured to at least:

perform the information processing using the second operation signal output from the input device;

while in a state where the second operation signal is used for the information processing, calculate, based on the first operation signal, a position indicated on a predetermined plane corresponding to displayed content;

while in the state where the second operation signal is used for the information processing, determine whether or not the indicated position has moved from a position on the predetermined plane that is outside of a predetermined area on the predetermined plane and to a position on the predetermined plane that is in the predetermined area on the predetermined plane;

switch the operation signals used for the information processing from the second operation signal output from the input device to the first operation signal output from the pointing device, when a result of the determination is positive in the state where the second operation signal is used for the information processing; and perform the information processing based on the indicated position, when the operation signals used for the information processing has switched from the second operation signal to the first operation signal.

14. An information processing system, including a plurality of apparatuses configured to communicate with each other, the information processing system being configured to use operation signals output respectively from a pointing device and an input device different from the pointing device and perform predetermined information processing in accordance with the operation signals, the information processing system comprising:

a first operation signal acquisition device configured to acquire a first operation signal output from the pointing device;

a second operation signal acquisition device configured to acquire a second operation signal output from the input device; and at least one processor configured to at least:

perform the information processing using the second operation signal output from the input device;

while in a state where the second operation signal is used for the information processing, calculate, based on the first operation signal output from the pointing device, a position indicated on a predetermined plane corresponding to displayed content;

while in the state where the second operation signal is used for the information processing, determine whether or not the indicated position has moved from a position on the predetermined plane that is outside of a predetermined area on the predetermined plane and to a position on the predetermined plane that is in the predetermined area on the predetermined plane;

when a result of the determination is positive in the state where the second operation signal is used for the information processing, switch the operation signals used for the information processing from the second operation signal to the first operation signal; and perform the information processing based on the indicated position, when the operation signals used for the information processing has switched from the second operation signal to the first operation signal.

15. An information processing method performed by a processor or by a cooperation of a plurality of processors, the processor or the plurality of processors included in an information processing system including at least one information processing apparatus capable of using operation signals output respectively from a pointing device and an input device different from the pointing device and capable of performing predetermined information processing in accordance with the operation signals, the information processing method comprising:

acquiring a first operation signal output from the pointing device;

acquiring a second operation signal output from the input device;

performing the information processing using the second operation signal output from the input device;

while in a state where the second operation signal is used for the information processing, calculating, based on the first operation signal output from the pointing device, a position indicated on a predetermined plane corresponding to displayed content;

while in the state where the second operation signal is used for the information processing, determining whether or not the indicated position has moved from a position on the predetermined plane that is outside of a predetermined area on the predetermined plane and to a position on the predetermined plane that is in the predetermined area on the predetermined plane;

when a result of the determination is positive in the state where the second operation signal is used for the information processing, switching the operation signals used for the information processing from the second operation signal output from the input device to the first operation signal output from the pointing device; and performing the information processing based on the indicated position, when the operation signals used for the information processing has been switched from the second operation signal to the first operation signal.

16. A non-transitory computer-readable storage medium having stored thereon an information processing program to be executed by a computer of an information processing apparatus that can use operation signals output respectively from a pointing device and an input device different from the pointing device and performs predetermined information processing in accordance with the operation signals, the information processing program, when executed, causing the computer to provide functionality comprising:

- first operation signal acquisition for acquiring a first operation signal output from the pointing device;
- second operation signal acquisition for acquiring a second operation signal output from the input device;
- operation mode setting for setting either one of a first operation mode where the first operation signal is used for the information processing, and a second operation mode where the second operation signal is used for the information processing;
- processing for: performing the information processing based on the indicated position when the first operation mode is set by the operation mode setting; and performing the information processing based on the second operation signal when the second operation mode is set by the operation mode setting;
- indicated position calculation for, when the second operation mode is set by the operation mode setting for the information processing to be performed based on the second operation signal, calculating, based on the first operation signal output from the pointing device, a position indicated on a predetermined plane corresponding to displayed content;
- indicated position determination for, when the second operation mode is set by the operation mode setting for the information processing to be performed based on the second operation signal, determining whether or not the indicated position has moved from a position on the predetermined plane that is outside of a predetermined area on the predetermined plane and to a position on the predetermined plane that is in the predetermined area on the predetermined plane; and
- operation mode switching for, when a result of the determination of the indicated position determination is positive in a state where the second operation mode is set by the operation mode setting, switching the settings made by the operation mode setting from the second operation mode to the first operation mode.

17. The information processing apparatus according to claim 13, further comprising a display device, and wherein the at least one processor is further configured to:

display on the display device an image representing a result of the performed information processing based on the first operation signal or the second operation signal, wherein the predetermined area on the predetermined plane is set to an entire display screen of the display device.

18. The information processing apparatus according to claim 17, wherein when it is determined that the indicated position on the predetermined plane, based on the first operation signal, has not moved from a position on the predetermined plane that is outside of the display screen of the display device and to a position on the predetermined plane that is on the display screen of the display device, performing the information processing based on the second operation signal, and displaying the image representing a result of the performed information processing based on the second operation signal, and when it is determined that the indicated position on the predetermined plane, based on the first operation signal, has moved from a position on the predetermined plane that is outside of the display screen of the display device and to a position on the predetermined plane that is on the display screen of the display device, switching the operation signals used for the information processing from the second operation signal to the first operation signal, and displaying the image representing a result of the performed information processing based on the first operation signal.

\* \* \* \* \*